May 29, 1956  B. O. HOWARD  2,747,816
CANARD TYPE AIRPLANE AND CONTROLS THEREFOR
Filed May 11, 1950  12 Sheets-Sheet 1
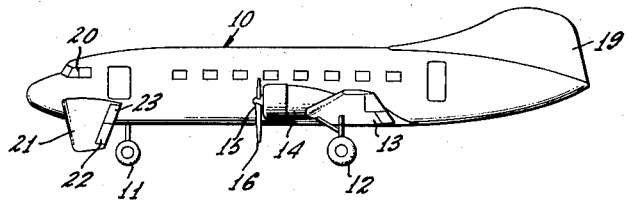
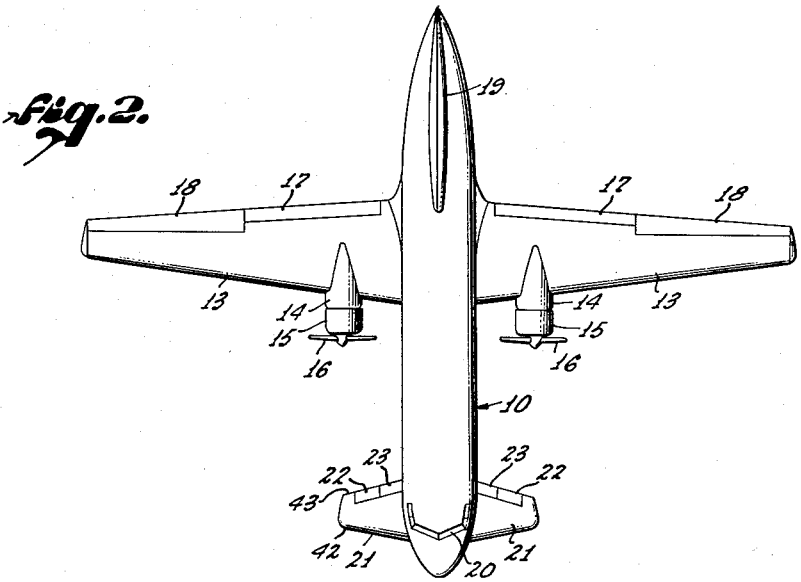
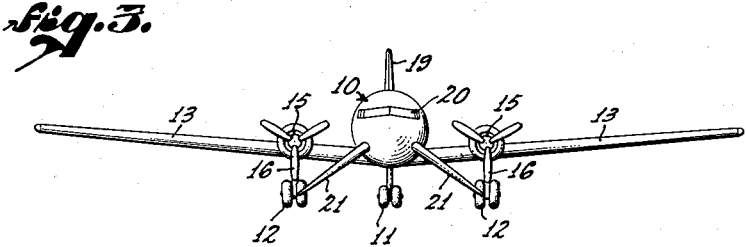
BEN O. HOWARD,
INVENTOR.
HUEBNER, BEEHLER, WORREL,
HERZIG & CALDWELL,
ATTORNEYS.

BEN O. HOWARD,
INVENTOR.

HUEBNER, BEEHLER, WORREL,
HERZIG & CALDWELL,
ATTORNEYS.
BY

LEVEL FLIGHT

LEVEL FLIGHT

NOSE DOWN-DIVE

NOSE DOWN

NOSE UP-CLIMB

NOSE UP-CLIMB

LEFT HORIZONTAL TURN

LEFT HORIZONTAL TURN

RIGHT HORIZONTAL TURN

RIGHT HORIZONTAL TURN

BEN O. HOWARD,
INVENTOR.

HUEBNER, BEEHLER, WORREL,
HERZIG & CALDWELL,
ATTORNEYS.

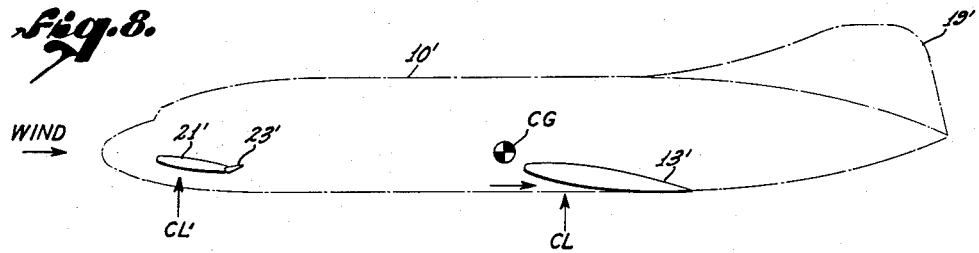
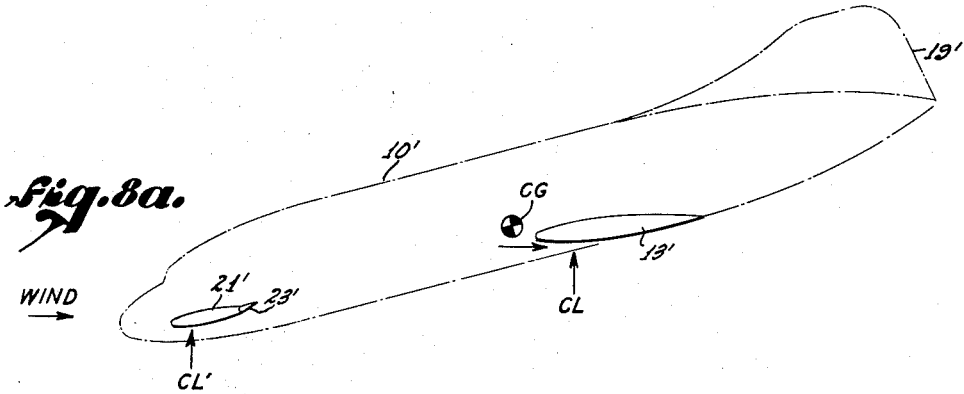
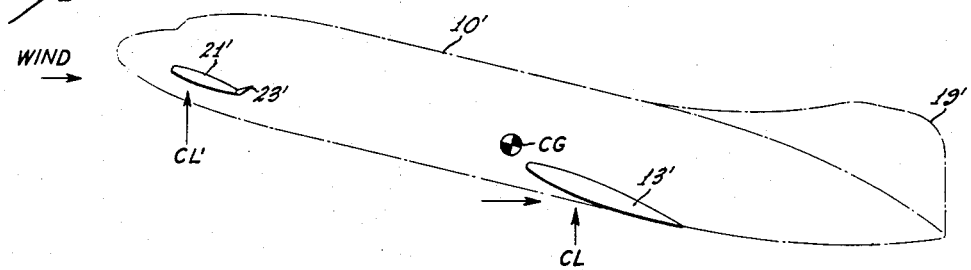
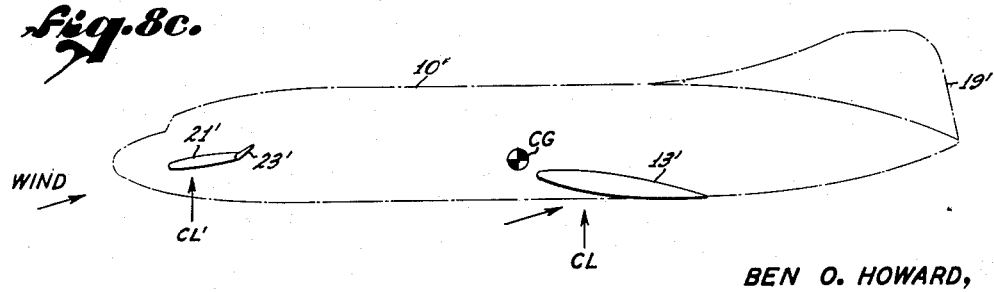

May 29, 1956  B. O. HOWARD  2,747,816
CANARD TYPE AIRPLANE AND CONTROLS THEREFOR
Filed May 11, 1950  12 Sheets-Sheet 5
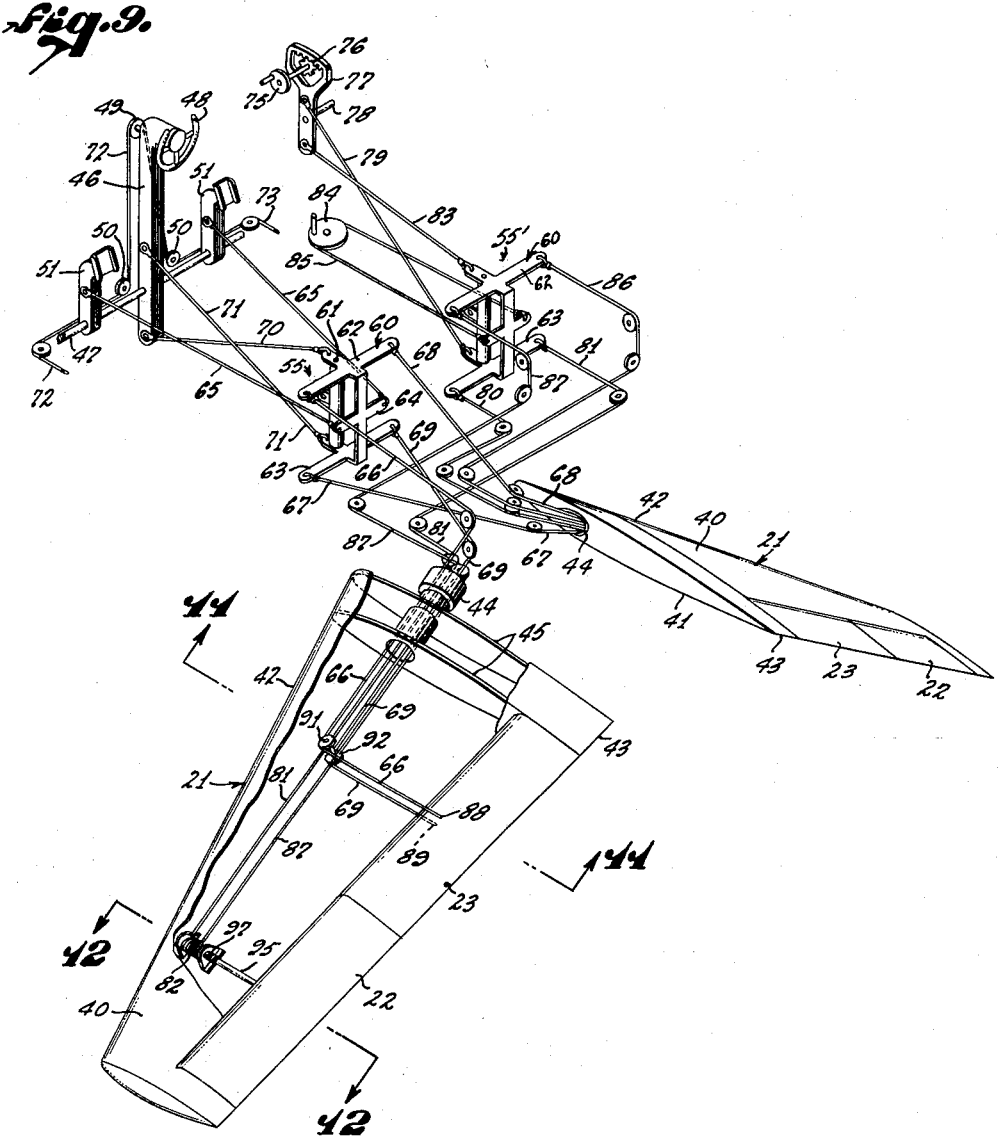
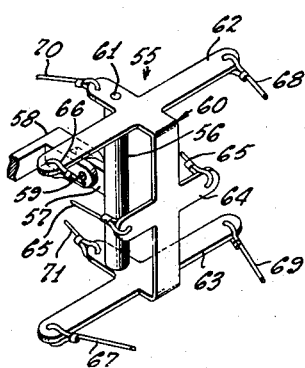
BEN O. HOWARD,
INVENTOR.
HUEBNER, BEEHLER, WORREL,
HERZIG & CALDWELL,
ATTORNEYS.
BY

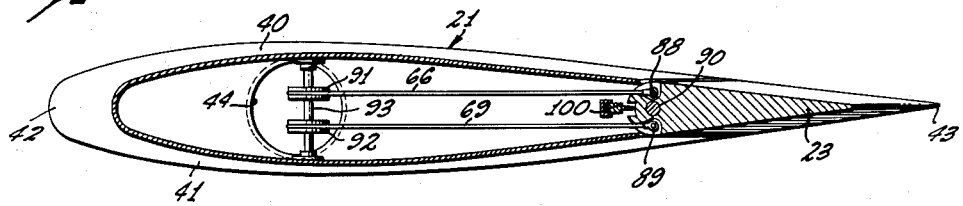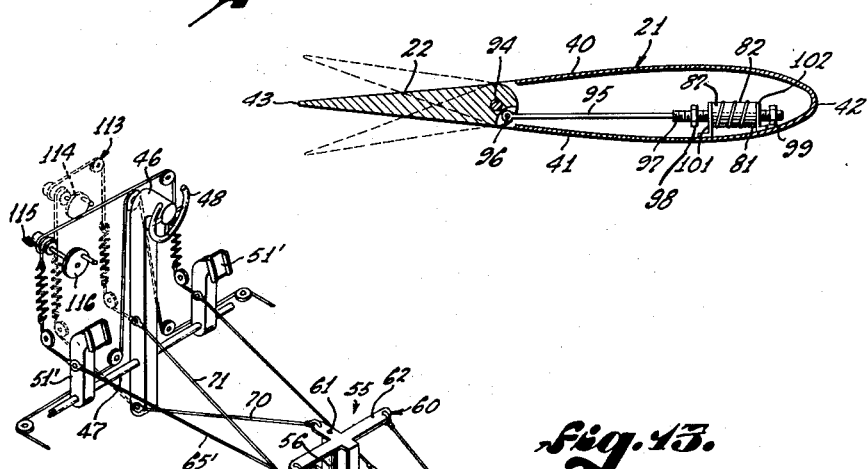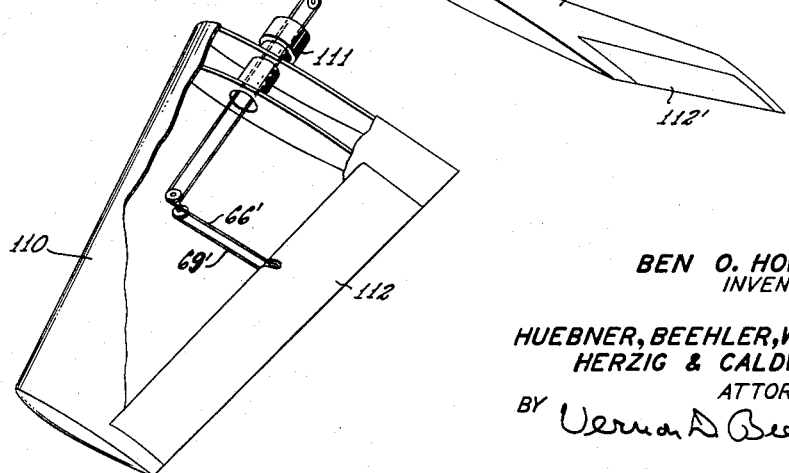

May 29, 1956 B. O. HOWARD 2,747,816
CANARD TYPE AIRPLANE AND CONTROLS THEREFOR
Filed May 11, 1950 12 Sheets-Sheet 7
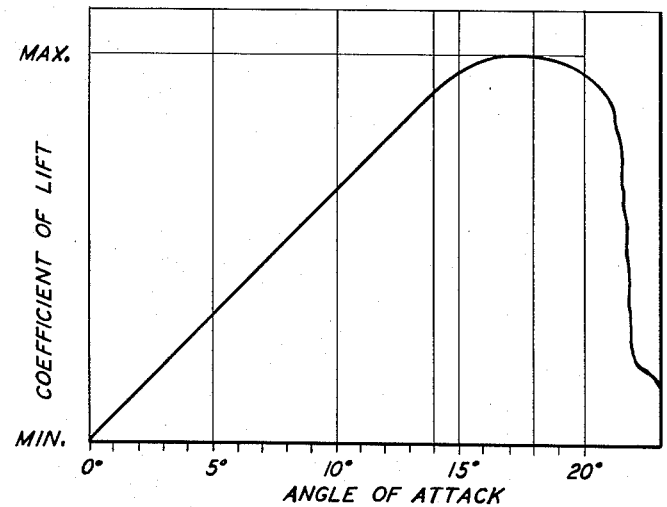
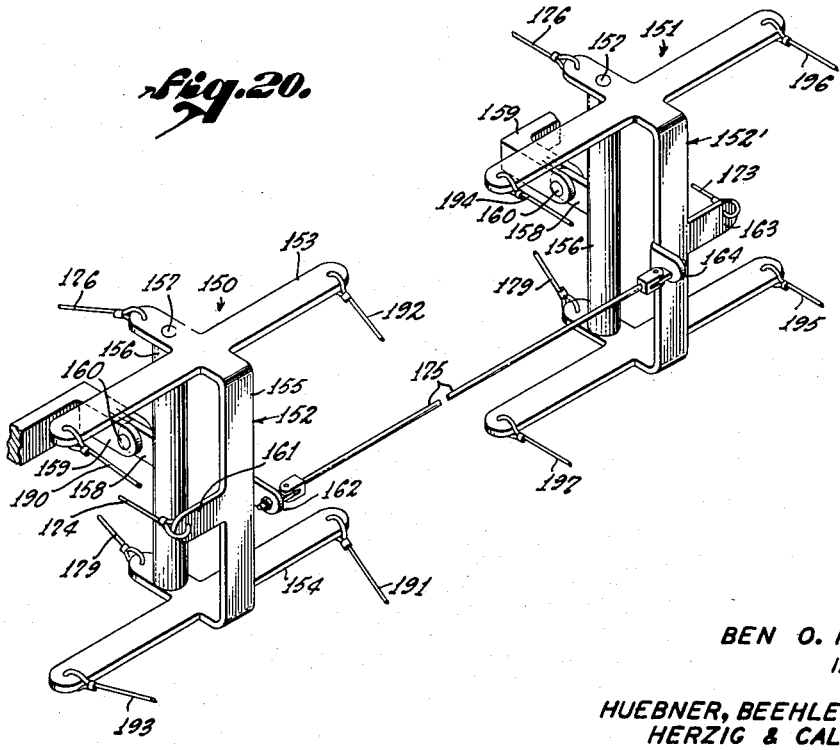
BEN O. HOWARD,
INVENTOR.
HUEBNER, BEEHLER, WORREL,
HERZIG & CALDWELL,
ATTORNEYS.

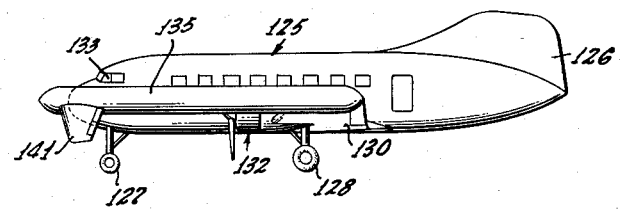
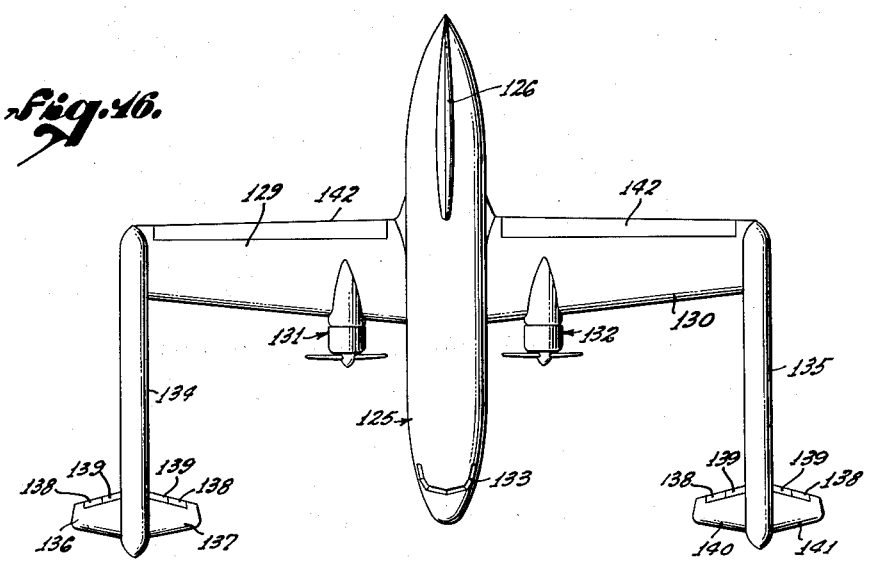
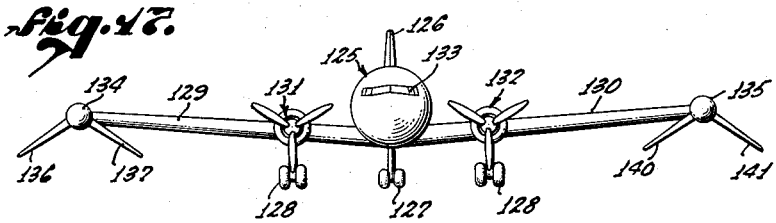

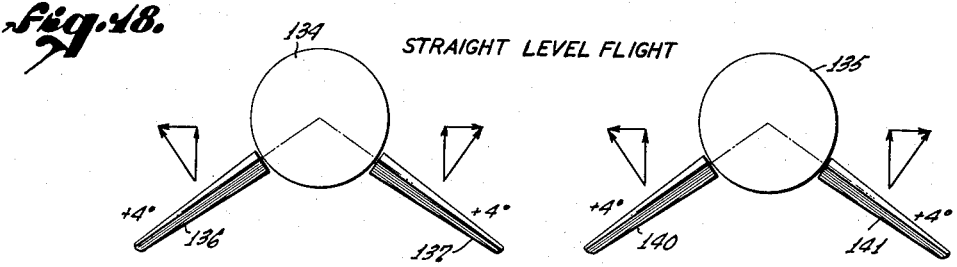
Fig. 18. STRAIGHT LEVEL FLIGHT
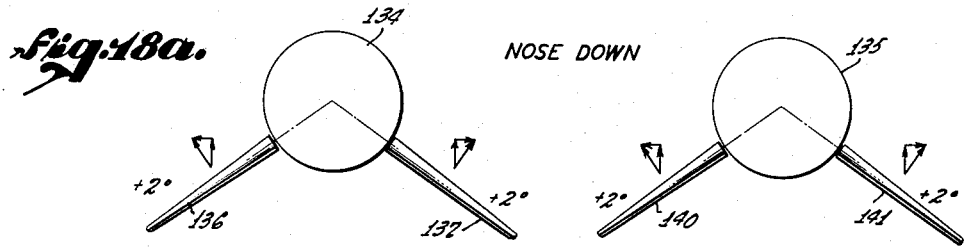
Fig. 18a. NOSE DOWN
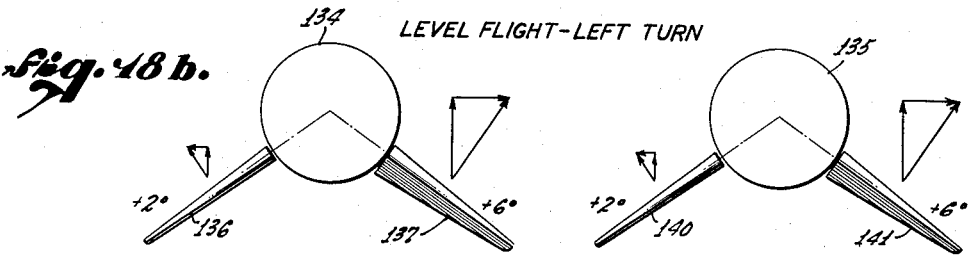
Fig. 18b. LEVEL FLIGHT – LEFT TURN
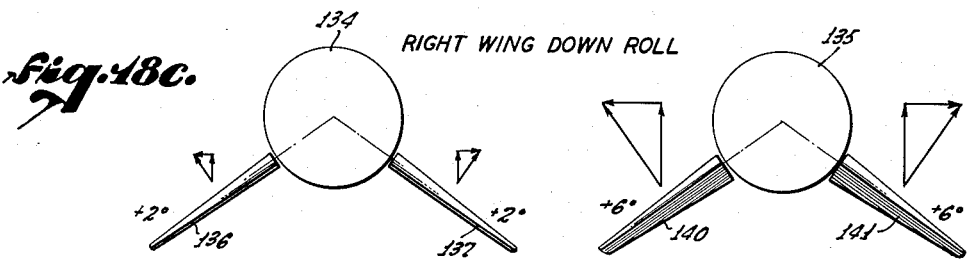
Fig. 18c. RIGHT WING DOWN ROLL
BEN O. HOWARD,
INVENTOR.
HUEBNER, BEEHLER, WORREL,
HERZIG & CALDWELL,
ATTORNEYS.

May 29, 1956　　　B. O. HOWARD　　　2,747,816
CANARD TYPE AIRPLANE AND CONTROLS THEREFOR
Filed May 11, 1950　　　12 Sheets-Sheet 10
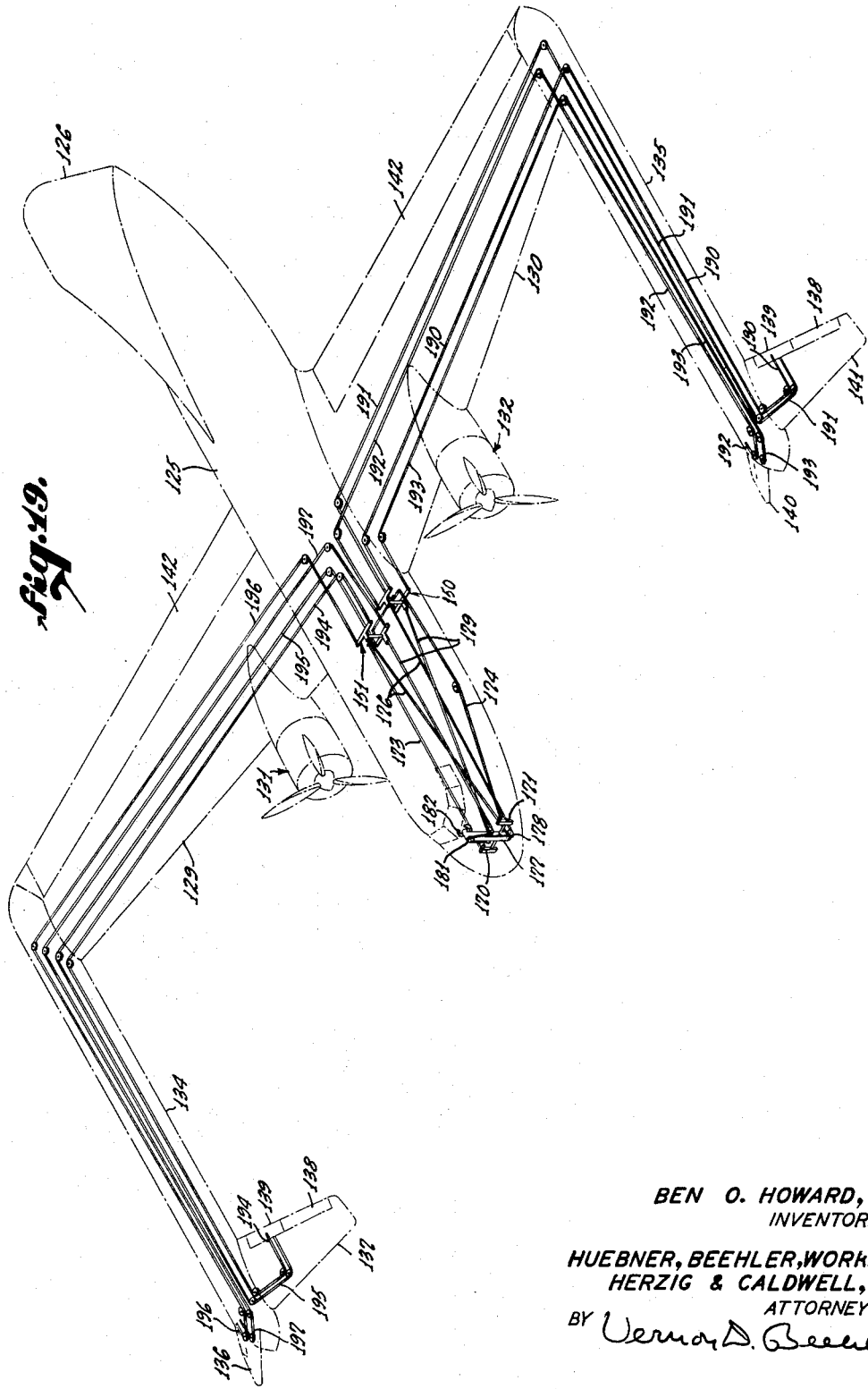
BEN O. HOWARD,
INVENTOR.
HUEBNER, BEEHLER, WORKEL,
HERZIG & CALDWELL,
ATTORNEYS.

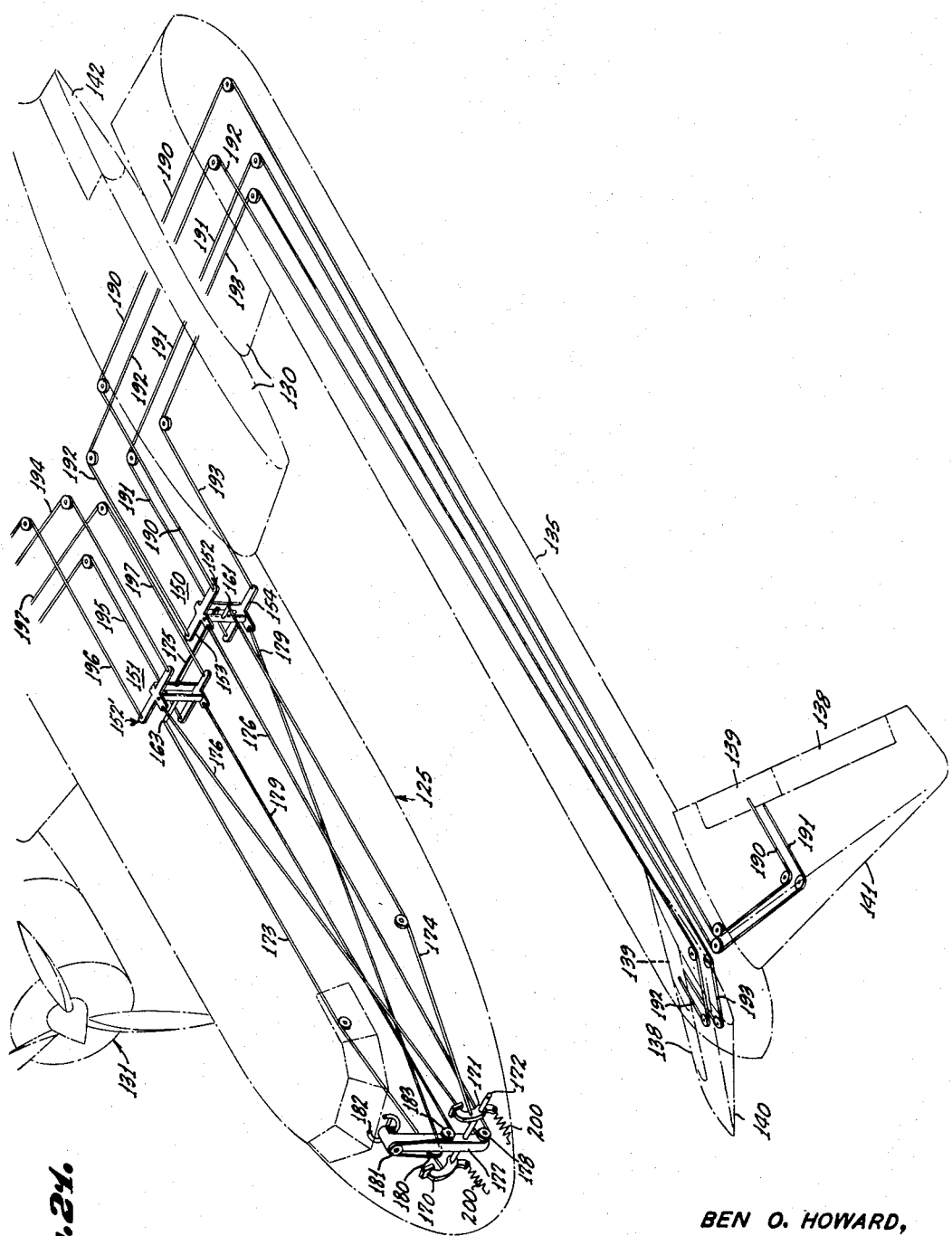

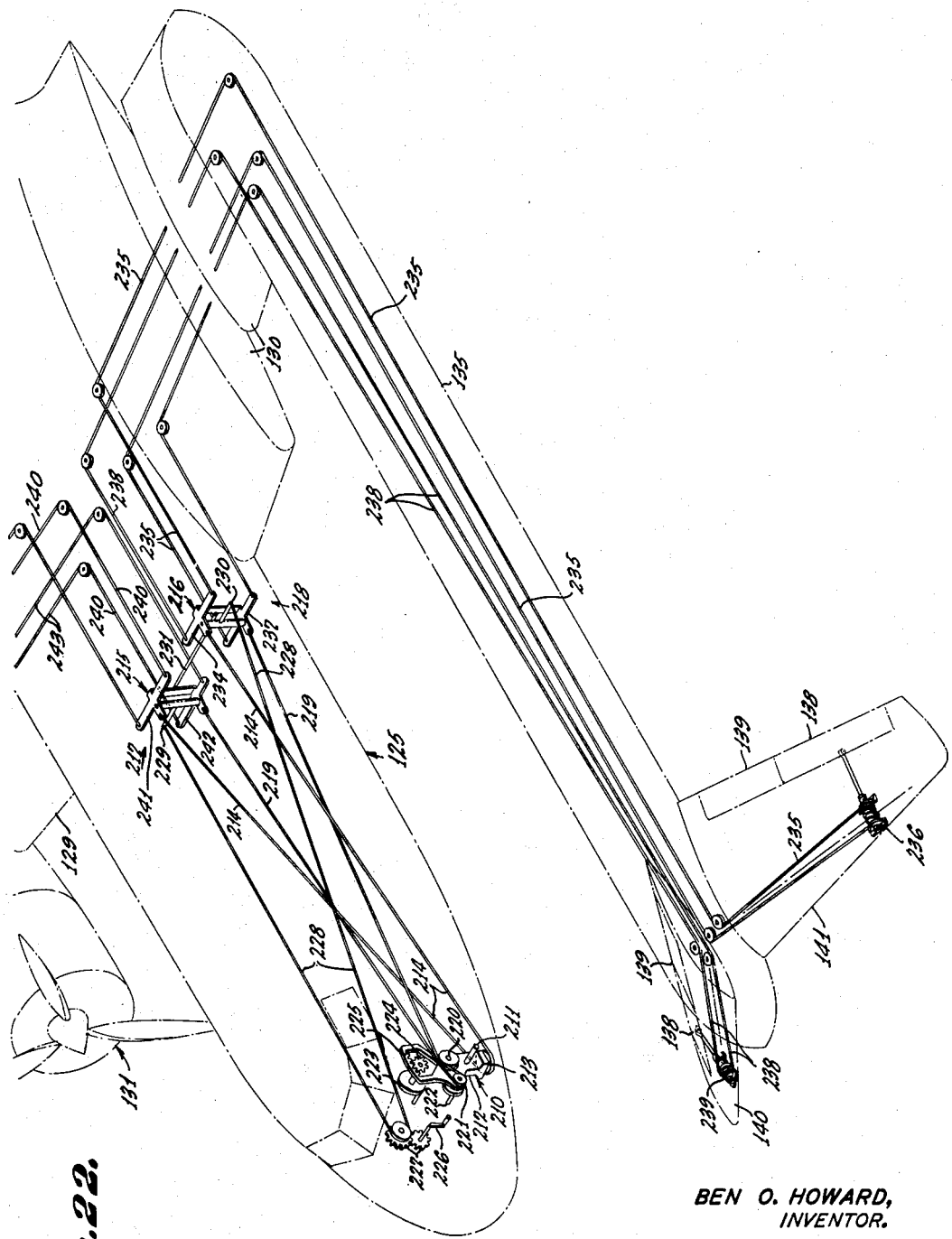

United States Patent Office 2,747,816
Patented May 29, 1956

2,747,816

CANARD TYPE AIRPLANE AND CONTROLS THEREFOR

Ben O. Howard, Los Angeles, Calif.

Application May 11, 1950, Serial No. 161,440

12 Claims. (Cl. 244—45)

The present invention relates to an airplane commonly designated as a tandem type or Canard type airplane wherein the lift of main wings located aft of the center of gravity is assisted by the lift of forward wings well in advance of the center of gravity. This is in contrast to the conventional type airplane, designs of which have settled upon the placing of the main wing to the rear of the center of gravity and having cooperable therewith an empennage section located rearwardly of the main wing. The invention herein disclosed contemplates structures of the so-called tandem type airplanes wherein control of one or all motions of the airplane, namely, directional, longitudinal and lateral, can be exercised by forward wing surfaces.

In conventional type airplanes, because of the center of gravity being disposed forward of the center of lift of the main wing, the forces on the empennage section act against the lifting forces on the main wing in order to obtain longitudinal balance. In consequence the lifting effect on the main wings must exceed the weight of the plane. The theory of design of conventional airplanes has in fact become so definitely fixed that aeronautical engineers working upon independent designs for an airplane to meet specific requirements habitually differ but very slightly one from another. The resulting designs still fall short of desirable efficiency and stability. Therefore, to improve efficiency and stability, among other things, radical departure from conventional design is indicated as being requisite.

Heretofore some attempts have been made to design tandem type airplanes but these attempts have met with questionable success. Although these previous attempts recognize some of the advantages in improved lift resulting from placing lifting surfaces forward of the center of gravity, on the other hand they have uniformly lacked stability and maneuverability to the extent that no appreciable success has attended efforts to produce and fly airplanes of this type. Furthermore, such airplanes of the Canard or tandem type as have been proposed have fallen short of providing a control scheme capable of meeting control requirements of an airplane in all directions.

It is therefore among the objects of the invention to provide a new and improved airplane which for a given load can be smaller in construction and consequently lower in cost or which conversely for the same cost and size is capable of a significant increase in lift.

Another object of the invention is to provide a new and improved airplane provided with forward lifting surfaces mounted to freely pivot in the air stream wherein control of the forward lifting surfaces is exercised by manipulation of control tabs or trim tabs or both whereby the airplane may be flown with a greater degree of control under varied and adverse conditions and under a margin of safety not heretofore experienced.

Still another object of the invention is to provide a new and improved airplane of the so-called tandem type which permits of an exceptionally wide deviation fore and aft in the location of the center of gravity which may result from loading of the airplane which would ordinarily not be possible in a conventional type airplane.

Still another object of the invention is to provide a new and improved tandem type airplane which can be constructed by utilization of twin booms and thus make possible the provision of full span flaps on the main wings which add greatly to the ability of the airplane to take off and land at relatively slow speeds and while carrying relatively heavy loads.

Still another object of the invention is to provide a new and improved airplane of the tandem type wherein the forward lifting surfaces are so constructed and controlled that the airplane is virtually stall-proof and also one which will automatically maintain its course under the influence of adverse air currents.

Also among the objects of the invention is to provide a new and improved tandem type airplane wherein the cost of production can be substantially decreased for the same or an increased lifting power and an airplane wherein there may be a reduction in the strength, length and weight of landing gear, the elimination of a rudder, increase in the effective length of landing flaps, decrease in the weight of wings and also one in which there is provided a control such that only a small force exerted upon the stick or rudder pedals is sufficient to achieve complete control of the airplane.

Further included among the objects of the invention is to provide a new and improved tandem type airplane which is especially well adapted to use of flying boats to the end that a positive lift is exerted on the nose of the flying boat whereby to lift it readily out of the water without it being necessary to depress the aft portion of the flying boat deeper into the water under take off speeds to lift the flying boat from the water.

A further object lies in the provision of a new and improved tandem type airplane in which can be incorporated a twin construction with forward lifting surfaces on booms on opposite sides of the airplane so directed that the forward lifting surfaces embody longitudinal, lateral and directional control at all times and which further provide for use of flaps of maximum possible width on the main wings and attendant advantages.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

In the drawings:

Figure 1 is a side elevational view of a tandem airplane incorporating the new and improved design with landing gear extended.

Figure 2 is a plan view of the airplane shown in Figure 1.

Figure 3 is a front view.

Figures 8, 8a, 8b and 8c are diagrammatic representations of a side view of the tandem airplane showing the airplane and lifting surfaces in various attitudes of flight.

Figure 9 is a diagrammatic perspective view showing flying control mechanism for control tabs and a trim control mechanism for trim tabs in the form of device illustrated in Figures 1-3 and 4-6.

Figure 10 is a perspective view of one of the multiple brackets or cable interconnecting devices by means of which proper control is had of control tabs on the forward lifting surfaces by utilization of conventional pilot control apparatus.

Figure 11 is a cross-sectional view of one of the forward lifting surfaces taken on the line 11—11 of Figure 9.

Figure 12 is a cross-sectional view of the same forward lifting surface taken on the line 12—12 of Figure 9.

Figure 13 is a perspective view of the forward lifting surfaces and a control mechanism for operating them wherein control tabs only are used to the exclusion of trim tabs.

Figure 14 is a chart showing a study of the relationship of angle of attack to coefficient of lift.

Figure 15 is a side elevational view of a new and improved airplane showing a modified form of a twin boom airplane.

Figure 16 is a plan view of the twin airplane shown in Figure 15.

Figure 17 is a front view of the airplane.

Figures 18, 18a, 18b and 18c are diagrams of the forward or floating wing positions on an airplane having a pair of parallel booms illustrating typical control positions.

Figure 19 is a perspective diagrammatic view showing twin boom tandem airplane in full flight and illustrating the manner of attachment of the conventional controls in the pilot cockpit to the tabs on both forward lifting surfaces so that the lifting surfaces on both booms can be manipulated in accordance with each other.

Figure 20 is a side elevational view of a pair of cable interconnecting devices suitable for use with a design like that of the twin boom arrangement.

Figure 21 is an enlarged view of one side only of the figure shown in Figure 19.

Figure 22 is similar to the view in Figure 19 except that trim tabs are shown connected to the trim mechanism in the pilot cockpit.

CATAHEDRAL AND DIHEDRAL CONSTRUCTION

Figure 4:
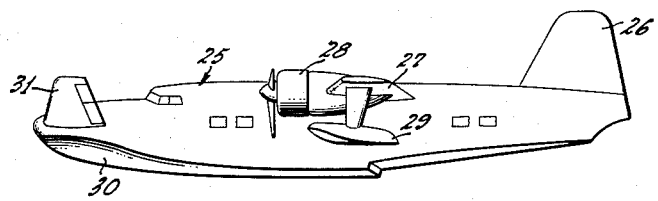
Figure 4 is a side elevational view of a flying boat incorporating the new and improved design.
Figure 5:
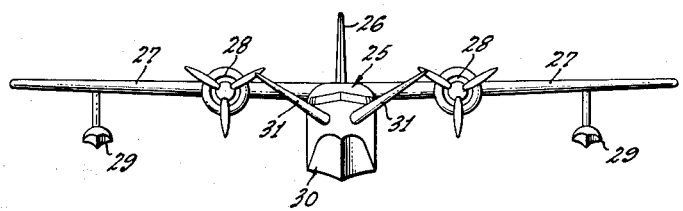
Figure 5 is a front elevational view.
Figure 6:
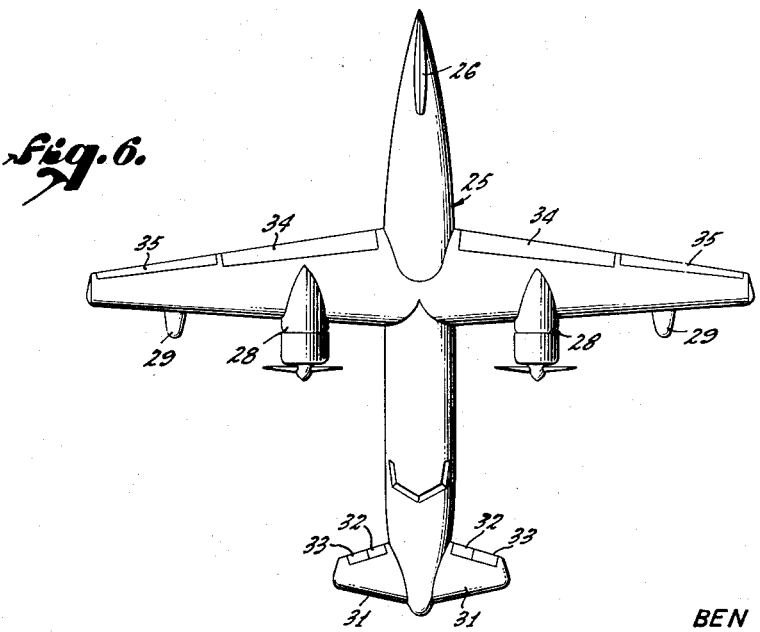
Figure 6 is a plan view of the flying boat.

Figures 1, 2 and 3 of the drawings illustrate a land type airplane of the tandem style utilizing a pair of forward floating wings or lifting surfaces constructed in accordance with the invention. Figures 4, 5 and 6 illustrate a sea plane of the tandem type wherein the forward floating wings or lifting surfaces are directed upwardly away from the water. In other respects, however, the principles controlling both the land plane and the sea plane are substantially the same.

In the airplane of Figures 1, 2 and 3 there is shown a fuselage section 10 provided with forward landing gear 11 and rear landing gear 12. A pair of main wings 13 are located slightly aft of the center of the fuselage and carry nacelles 14 for engines 15 which operate conventional propellers 16. The wings as illustrated in Figure 2 are equipped with flaps 17 and ailerons 18. A vertical keel 19 is located at the rear of the fuselage, a pilot compartment 20 being located adjacent the nose.

Also adjacent the front end of the fuselage there are provided a pair of forward lifting surfaces or floating wings 21 each in turn provided with a trim tab 22 and a control tab 23. The pair of floating wings in a sense may be understood as standing in the place of an empennage in that they serve as both a rudder and as a vertical control. A significant aspect of the floating wings is the manner of attachment to the airplane. The floating wings are in fact pivotally secured to the airplane in a manner such that the floating wings are completely free to pivot about an axis extending lengthwise of the floating wings at a location intermediate the leading and trailing edges of the floating wings. The pivot axis should be located forward of the aerodynamic center of the floating wing.

Although a boom or extension at the nose of the airplane might be utilized, the floating wings in the embodiment illustrated are attached directly to the fuselage.

In Figures 4, 5 and 6 there is shown a flying boat with a substantially standard fuselage or hull construction 25 at the rear end of which is a vertical keel 26. Main wings 27 are located aft of the center of the fuselage and carry motors 28. The main wings may also be provided with pontoons 29. Underneath the fuselage or hull is a streamlined portion 30 which is adapted to ride the surface of the water and deflect the spray. Again in Figures 4, 5 and 6 floating wings or forward lifting surfaces 31 are employed and are fastened to the fuselage as previously noted so that they are free to rotate substantially a full 360 degrees. The tilt of the floating wings in the air stream is controlled in a manner similar to that in the land plane, namely, by use of control tabs 32 and trim tabs 33. On the main wing there may be provided both flaps 34 and ailerons 35 for operation in the conventional manner.

It is significant that the floating wings of the forward lifting surfaces extend either downwardly forming a catahedral angle or upwardly forming a dihedral angle. Unless the floating wings are so constructed and mounted, much of the effectiveness of the tandem airplane is lost. General details of the pivotal mounting are covered to a measure in Figure 9 later to be described. Important also is the fact that the tabs only of the floating wings are subject to direct control by the pilot. No control is exercisable directly on the floating wings. By imparting to the tabs a desired angular tilt with respect to the floating wing the tilt or angle of attack of the floating wing itself relative to the air stream is determined. At the same time, however, the angular disposition of the floating wing with respect to the airplane is not fixed and may vary considerable depending on changes in the direction of the wind or air stream since no direct control at all is exercised over the pivotal position of the floating wing with respect to the fuselage.

Figure 7:
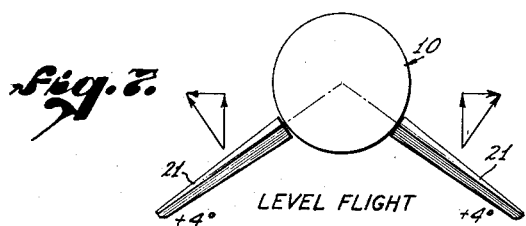
Figures 7, 7a, 7b, 7c, 7d, 7e, 7f, 7g, 7h and 7i are diagrammatic illustrations of positions of forward lifting surfaces for both the airplanes of Figures 1–3 and 4–6, respectively, adjusted as indicated to effect a corresponding movement of the airplane.
Figure 7E:
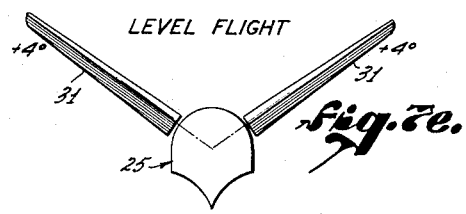
Figure 7A:
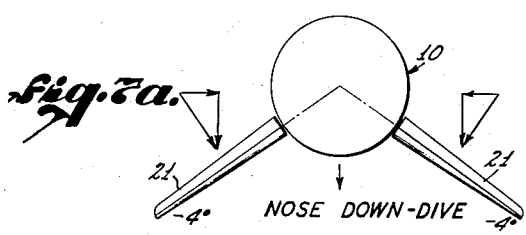
Figure 7F:
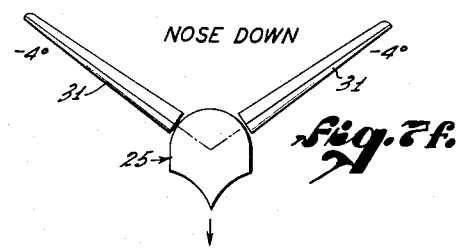
Figure 7B:
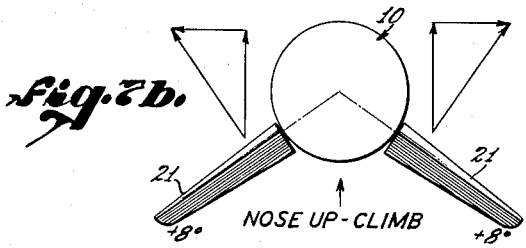
Figure 7G:
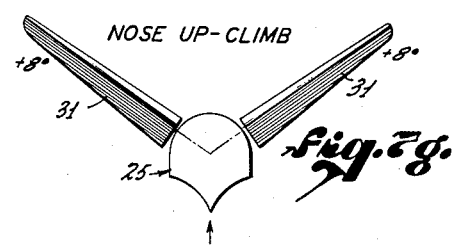
Figure 7C:
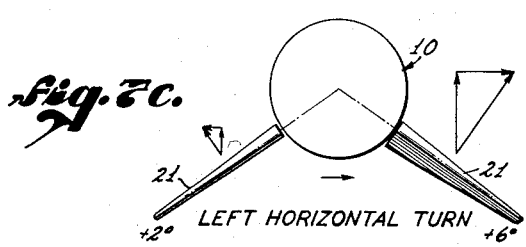
Figure 7H:
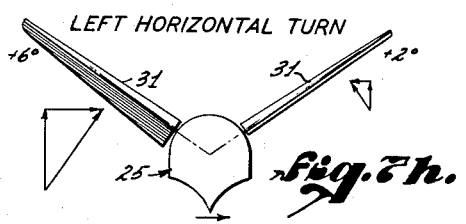
Figure 7D:
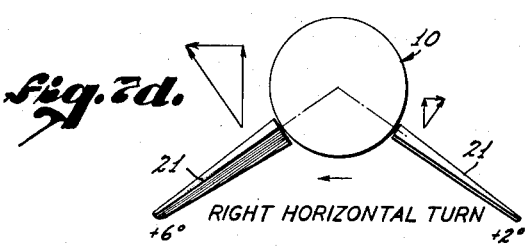
Figure 7I:
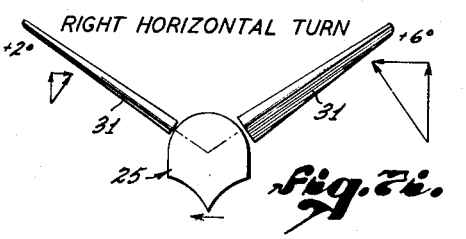

An understanding of how the floating wings are used to achieve both directional control and vertical or longitudinal control can be gained from an examination of the various angular positions of the floating wings shown diagrammatically in Figures 7 through 7i, inclusive, and the accompanying vector diagrams. Figures 7 through 7d refer to the land type plane of Figures 1-3 and 7e through 7i to the sea plane of Figures 4-6.

In the land type plane, for example, where there is a given load on the airplane, all the wings must be tilted upwardly to a positive angle of trim in order to apply the required lifting force to the wings as the airplane is driven forward. Let it be assumed that in order to properly fly, the wings must assume an angle of attack of 4 degrees. Reference to Figure 7 in company with Figures 8, 8a and 8b will be helpful in understanding how the airplane is controlled. It will be noted that the floating wings 21 are tilted upwardly to an angle of 4 degrees in order to supply the necessary lift for maintaining the airplane in flight. The 4-degree tilt will maintain level flight under normal conditions. This means that the lift is applied by the floating wings at the forward end of the plane, namely, at a point well in advance of the center of gravity. The lift is in an amount sufficient to balance the lift of the main wings which are located slightly rearwardly of the center of gravity. Obviously the lift of the main wings near the center of gravity must be greater to balance a lesser lift far from the center of gravity where, as here, the application of the loads is similar to the loading in a first-class lever.

With this arrangement, should it be desired to nose down an airplane of the type shown in Figures 1, 2 and 3, the angle of attack of the floating wings is reduced. A figure of 4 degrees has been selected by way of illustration. At this point it should be borne in mind that the direction of the 4-degree angles referred to in Figures 7–7i have specific reference to the angle of attack of the floating surface and not to the direction of tilt of the tabs. To secure that angle of attack control tabs like those indicated by the reference character 23 in Figure 2 must be tilted upwardly relatively to the surface of the floating wing in order that the floating wing surface may be tilted rear or trailing edge downwardly. In good construction the angle of tilt of the tab will be approximately equal to the angle of attack of the floating wings and the angle of attack of the floating wings will be substantially the same as the angle of attack of the main wings.

An examination of the vector diagrams in connection with Figure 7 will indicate that the force of the air stream applied at 4 degrees against the floating wing surface produces a vertical lift component which is the same on both sides of the fuselage. Equal horizontal side thrust components are also created on both sides but the side thrusts are in opposite directions. Therefore there is no directional thrust and the lifting surfaces are applied equally on both sides.

Now should the pilot desire to nose the airplane down for a descent or dive, the control tabs are rotated or tilted so that they are moved downwardly. A reduction of the initial angle of 4 degrees to one less than 4 degrees is sufficient or for a more abrupt descent the angle may even be a negative angle with the tab extending below the floating wing. This in turn causes the floating wings to tilt downwardly. Lift on the floating wings is reduced and the airplane therefore noses down, but the airplane will still not turn to right or left because the right and left-hand thrusts remain the same.

Conversely should it be desired to nose the airplane up for an ascent or climb, then the angle of attack of the floating wing must be increased to some angle greater than 4 degrees. In Figure 7b the wing tilt is shown as plus 8 degrees. This means in turn that there is a substantial increase in the lifting force on the floating wings indicated by the vertical vector which, when balanced by an increase in lift of the main wings, adds considerably to the lifting force of the airplane. Although the transverse vectors are also larger than those in Figures 7 or 7a, they nevertheless balance each other out as did the forces in Figures 7 and 7a so that the airplane maintains flight in a course straight ahead.

Under circumstances where the pilot desires to turn the airplane right or left while in level flight, an adjustment adapted to tilt the floating wings in one or another of the positions illustrated in Figures 7c or 7d is appropriate. In the adjustment of Figure 7c the left floating wing, as viewed from the cockpit, is shifted to a plus 6-degree angle of attack accomplished by means of tilting the control tab of the corresponding wing to an angle of approximately the same amount. At the same time the right floating wing, as viewed from the cockpit, has its angle of attack reduced by 2 degrees in the example diagrammed in Figure 7c. Consequently the greater lateral thrust is toward the left as viewed from the cockpit and the lesser lateral thrust is toward the right. The resultant force will therefore turn the airplane toward the left. Level flight is maintained and results from a lateral balanced condition. That is to say, the increase in lift resulting from adding 2 degrees to the initial 4-degree tilt of the left floating wing is balanced out by having the tilt of the right floating wing diminished by 2 degrees. The sum of the degrees of tilt therefore aggregates 8 degrees which results in the same total lift as for normal level flight, as diagrammed in Figure 7. Consequently in Figure 7c there is just as much lift on the nose of the airplane as under ordinary level flying conditions except that there is an increase of side force components on the left-hand side due to reaction of the air stream and a reduction in side force on the right-hand side of Figure 7c to the end that the airplane thus controlled will turn in a horizontal plane toward the left.

Conversely, as illustrated in Figure 7d, for a right horizontal turn the right floating wing, as viewed from the pilot seat, is tilted at the greater 6-degree angle and the left floating wing to the lesser 2-degree angle. Maintaining the arithmatic sum of the angles of attack at the same figure as in Figure 7 assures level flight. The greater side force is present on the right-hand floating wing, as viewed from the airplane, than is present on the left-hand floating wing, as will be understood from the vector diagrams. For that reason the airplane is turned toward the right. Were it not for the pitch of the floating wings downwardly from horizontal as in Figures 1–3 (or the pitch upwardly as in Figures 4–6), there would be no lateral force components and hence directional control would not be possible but only control in a vertical direction.

Control of the flying boat is achieved in a substantially similar manner particularly with respect to tilt of the floating wings 31 to achieve level flight, ascending and descending attitudes. The manipulation of the control tabs for left turn and right turn are, however, exactly the opposite from that used for the land type airplane with its cataheadral angle. For the dihedral angle of the sea plane in making a turn toward the left, as viewed from the pilot's seat, and as indicated by the arrow in Figure 7h, the floating wing 31 on the right side of the airplane is tilted at an angle greater than the floating wing on the opposite side. An examination of the vector force diagrams will indicate the greater force to be toward the left, thereby causing the airplane to turn left. When the converse is true the airplane is caused to turn right.

It will become apparent further that lateral control is not possible with a single set of floating wings. Therefore whether the airplane be a land type airplane of the type shown in Figures 1, 2 and 3 or a seaplane like those shown in Figures 4, 5 and 6, ailerons are necessary. These, however, are installed in a conventional way and operated by a conventional hook-up from the pilot control seat.

EFFECT OF FLOATING WINGS ON CONTROL

An examination of Figures 8 through 8c, inclusive, will be helpful in understanding the aerodynamic principle involved in the use of forwardly disposed floating wings. As there illustrated diagrammatically, a fuselage section 10' is provided with a vertical keel 19' and main wings 13' tilted to an upward angle of attack as is usual. The center of gravity of the structure is indicated by the character CG and the center of lift of the main wings is indicated by the arrow CL. The fuselage is provided with forwardly disposed freely floating wings or lifting surfaces 21' and it is important to note that the axis of rotation of the floating wings is intermediate the leading and trailing edges so that there is a center of lift CL' for the floating wings indicated by the appropriate arrow, which is located well forward of the center of gravity of the airplane.

With this arrangement of forces it will be apparent that although the main wing is doing the greatest amount of lifting because of being larger and nearer the center of gravity, nevertheless the forward floating wings are also lifting, they being located on the opposite side of the center of gravity. Because the effect of lift on all of the lifting surfaces is upward, their sum total need be no more than equal the weight of the airplane. This is not true of conventional airplanes wherein the lift on the empennage wings must be offset by extra lift on the main wings because of the center of gravity being located forwardly of both sets of wings.

Let it be assumed by way of example that the weight of the airplane concentrated at the center of gravity is 10,000 pounds. If the lift applied at the center of lift of the main wings were 8,000 pounds, then the lift on the floating forward wings would need be no more than 2,000 pounds, aggregating 10,000 pounds in all.

Assume, on the other hand, the application of corresponding figures to an airplane of conventional design with a weight of the magnitude of 10,000 pounds. If the air force on the empennage at the tail section some distance aft of the center of gravity were 2,000, this would have to be in a downward direction. The lift of the main wings near but on the same side of the center of gravity would be upward but would have to be 12,000 pounds instead of 8,000 pounds, namely, 2,000 pounds to overcome the counter-lift of the rear empennage and 10,000 pounds to actually lift the weight of the airplane. From this analysis it will become readily apparent that in a properly designed tandem type airplane like that herein disclosed the amount of load capable of being lifted by the wing surfaces is greatly in excess of that capable of being lifted by conventionally disposed wing surfaces where the total lifting surfaces in each case are the same.

Another factor greatly to the advantage of the tandem type airplane herein described is that the location of the center of gravity of the airplane may be varied considerably as long as it is kept in advance of the center of lift of the main wing surfaces. Should the center of gravity be shifted it is necessary to do no more than slightly trim the floating wings whereupon once trimmed for the new location of the center of gravity the airplane remains longitudinally stable.

In Figure 8 by way of example there is illustrated an airplane in straight level flight. With the main wings tilted up slightly as shown to provide a lifting force a corresponding lifting force must be created on the floating wings. This is accomplished by tilting the control tabs 23 upwardly an angular amount of about 4 degrees. With the airplane being driven forwardly the effect of the control tabs will be to tilt the floating surfaces 21' upwardly about 4 degrees, thus providing a necessary lifting force upon the forward floating wings as well as the rear wings of the airplane. By way of example it may be assumed here also that the weight of the airplane is 10,000 pounds carried by a 2,000 pound lift on the floating wings and an 8,000 pound lift on the main wings.

To dive or nose down the airplane as illustrated in Figure 8a, the angle of the control tabs 23' is reduced in the example chosen to a positive angle of 2 degrees. This will cause a reduction in the angle of attack of the floating wings 21' to about 2 degrees with respect to the air stream. Because of a reduction in the angle of attack by about one-half there will be a reduction in lift on the floating wings which for the purpose of illustration can be assumed to result in an effective lift of 1000 pounds. Since the lift on the main wings remains momentarily the same, namely, 8,000 pounds, the longitudinal attitude of the airplane about its center of gravity will be changed so that the nose of the airplane tilts downwardly, the reduction in the lift of the floating wings changing the balance. The airplane will continue to nose down until it reaches a position where the angle of attack of the main wings is also about 2 degrees. This it can be assumed will change the total lift of the main wings to 4,000 pounds which will again balance the airplane longitudinally about its center of gravity. Although balanced, the total lift on the wings of the airplane in the new attitude of flight will be only 5,000 pounds in the example chosen or only half the weight of the airplane. Therefore, the airplane will continue to dive or descend as it in thrust forward by the power plant of the airplane but will dive or descend in balanced flight with some increase in speed. Should the airplane nose down momentarily too much, the floating wings will orient themselves in the direction of the air stream and thereby continue to maintain the same lift, the tendency of which will continue to rebalance or stabilize the airplane.

Conversely, if the tabs 23' are tilted upwardly, they will increase the angle of attack of the floating wings 21' and for the sake of illustration it can be assumed that the angle of attack is increased to 8 degrees resulting from an increase in the positive angle of the control tabs to 8 degrees. The airplane will then assume the attitude shown diagrammatically in Figure 8b. An increase in the angle of attack of the floating wings by double the amount may be assumed to double the lifting force or lift coefficient on the forward wings. Using the same figures by way of illustration as previously selected, the lift on the floating wings may be said to be 4,000 pounds. The immediate effect of this increase in lift will tend to rotate the nose of the airplane upwardly about the center of gravity as travels forward in a nose-up position. The airplane will continue to nose-up until the angle of attack of the main wings becomes 8 degrees at which point the lift upon the main wings will be about doubled, reaching an assumed amount of 16,000 pounds, which amount will balance the increased lift of 4,000 pounds on the floating wings. Again the airplane will be stabilized about the center of gravity but in an ascending attitude because the total lift of both sets of wings will be about double the weight of the airplane. Consequently the airplane will continue to ascend or climb as long as the control tabs are held to the plus 8-degree angular relationship with respect to the floating wings.

To explain the action of the airplane constructed as herein described to react against air disturbances such as gusts, let it be assumed again that the airplane is initially in level flight as illustrated in Figure 8. Under these conditions should there be a gust of wind upwardly at, let it be assumed, a 4-degree angle, the normal tendency in conventionally designed airplanes would be to tilt such airplane's nose upwardly. In an airplane designed in accordance with the principle herein disclosed, the effect of the gust is balanced by the action of the floating wings.

Assuming again the lifting effects previously referred to, with an upward gust of 4 degrees the lift on the floating wings 21' will not change because the entire floating wing surfaces will tilt in the stream of air so as to maintain the initial 4-degree angle of attack. There will consequently be no lifting moment at the nose of the airplane about the center of gravity. Because of the change in direction of the stream of air upon the main wings, the effective angle of attack will become 8 degrees instead of 4 degrees resulting in a momentary increase in lift of the main wings tending to tilt the airplane nose downwardly about the center of gravity. The tendency to tilt will, however, be no more than momentary since as soon as the airplane tilts far enough so that the effective angle of attack of the main wings with respect to the air stream becomes 4 degrees, the airplane will be again in balance. As soon as the gust ceases, the airplane will resume an attitude of level flight. Should the gust continue to be one of appreciable duration, the airplane will continue to nose downwardly or dive because of the lift on the main wings overbalancing the lift on the floating wings. To reach an attitude of level flight under such conditions the floating wings would need to be trimmed to give the floating wings a greater angle of attack relative to the airplane. In practice, however, because of the angular inertia of the airplane, the result of a momentary upward gust will be little more than to lift the whole airplane upwardly slightly after which it will settle itself again to a balanced flight attitude.

To make certain that the tandem type airplane herein described will not result in a construction which might fall into a spin or stall, the angular tilt of the flying tabs 23 or 23' on the floating wings can be limited. To determine the workable limit, attention is invited to Figure 14 showing a graph wherein for a given set of conditions the coefficient of lift is plotted against the angle of attack of the wing. It has been well established and known to those skilled in the art that the coefficient of lift will vary with respect to the angle of attack in a manner similar to that shown in the graph. Without it being necessary to chart actual numerical quantities for the coefficient of lift it is sufficient to indicate that at about 14 degrees of angle of attack the coefficient of lift begins to fall off slightly until an angle of attack of 18 degrees is reached whereupon the coefficient of lift appreciably declines.

To understand the action of the airplane and its ability to avoid stalling or spinning it should be appreciated that when reference is made to a stalling angle it is considered as the greatest angle which the lifting surfaces can assume without loss in lift. The stalling angle for any given design might differ considerably depending upon the design of the wings, the balance of the airplane as a whole, and other factors. Although some considerable variation might be experienced, an angle of 18 degrees is often found to be the stalling angle. In discussing the principle of operation of a tandem airplane of the type illustrated in this disclosure the stalling angle is assumed to be about 18 degrees for purposes of illustration. If for the particular design herein described the stalling angle is assumed to be 18 degrees, the angular movement of the control tabs should be limited so that they cannot assume an angle of more than the same 18 degrees with respect to the floating wing surfaces. When the control tabs are thus limited, the hazard in spinning and stalling of the tandem airplane herein described is minimized.

To further understand this characteristic of the invention, attention is again directed to the fact that each floating wing as a unit is in no wise connected to the pilot's controls, so that ignoring, for the moment, the other tabs and controls, also shown associated with the units, if the airplane is pitched upwardly, for instance, about its center of gravity, by action of gusts, thermal currents, or the like, the floating front wings will trail in the relative air stream and maintain the initially set angle of attack with respect thereto. Hence, the total lift will remain constant. At the same time, the lift of the main wings will be increased because of their greater angle of attack, with the result that a restoring moment will be produced tending to return the airplane to the angle it had with respect to the air stream before the disturbance occurred. As the original attitude is approached, the lift of the main wing decreases until each set of wings again assumes its normal proportion of the total load. As the airplane approaches this position, the floating wings will gradually reassume that neutral position which is predetermined by the setting of the tabs.

Similar, but reverse, action takes place upon downward pitching of the airplane. Moreover, if the pilot's hands are removed from the control column, the airplane will trim itself, and this action will also automatically occur if the control tabs are left in, or are held in neutral by the pilot.

This characteristic of the floating wings is particularly useful during landing or take-off of the airplane, when the landing flaps 17 of the main wings are deflected downwardly. Although downward deflection of the landing flaps advantageously increases the maximum lift coefficient and hence facilitates landing or take-off, it also effects a rearward movement of the center of pressure of the wings. This rearward movement of the center of pressure sets up a negative wing pitching moment having a downward direction and sometimes of a magnitude sufficient to cause the airplane to nose downwardly to an undesirable extent. By virtue of the presence and functioning of the floating wings, however, this adverse pitching moment is automatically overcome for, when this moment deflects the nose of the airplane downwardly, the free floating wings trail in the relative air stream and maintain their lift. Since the lift of the main wing will be reduced with its decrease in angle of attack the combination of the two will produce a restoring moment which will tend to maintain the airplane in substantially its original attitude.

As hereinabove explained, the floating wings cannot stall of themselves and, as just explained, will automatically and aerodynamically prevent the main wings from stalling. It hence is impossible for the airplane to remain of itself in that particular stalling attitude which it is necessary for it to maintain in order to auto-rotate in the form of a spin.

The floating wings, having always a positive angle of incidence and being located ahead of the center of gravity of the airplane, always support a substantial portion of the weight of the airplane. This portion varies from a minor percentage, at small angles of attack of the floating wings, to a larger percentage at increased angles of attack.

Maximum possible deflections of the tabs may be limited to such a degree that the floating wings cannot be given an angle of attack by the control tabs 23 or 23' which will cause the floating wings to assume a stalling angle of attack.

Although the center of gravity of the present airplane is always positioned between the center of pressure of the floating wings and that of the main wings, an unusually large range of locations of the center of gravity is possible in the airplane without producing longitudinal instability. This advantage flows from the fact that the floating wings will automatically maintain an attitude producing a constant lifting force determined by the setting of the control tabs 23 or 23' which may be adjusted upwardly in an increasing amount as the center of gravity moves forward, or in a lesser amount as the center of gravity moves rearward.

STRUCTURE AND OPERATION OF SINGLE SET OF FLOATING WINGS

*Control tabs*

As illustrated diagrammatically in Figure 9, floating wings 21 are designed to be located on opposite sides of the fuselage and pitched downwardly in a cathedral angle. The wings consist of upper surfaces 40 and lower surfaces 41. Leading edges are designated by the reference characters 42 and trailing edges by the reference characters 43. Control tabs 23 and trim tabs 22 extend end to end across the trailing edge of each wing. A sleeve or torque tube 44 is securely mounted in bulk heads 45 of the floating wing in each case, the sleeve being used for the sole support of the wing. Although not shown in detail the sleeve 44 is mounted in the fuselage of the airplane in a manner permitting complete freedom of rotation of the wing 21 about the longitudinal axis of the sleeve. The sleeve, moreover, is hollow to permit passage therethrough of control cables from the pilot's cockpit and control mechanism, respectively, to the control tabs and trim tabs. Also in Figure 9 there is shown diagrammatically a control column 46 pivotally mounted upon a shaft 47 and carrying a wheel 48 to the axle of which is attached a pulley 49. Pulleys 50 are carried by the control column in the conventional manner and adapted to rotate about an axis on the column. The same shaft 47 may support rudder pedals 51. Movement of the control column and the rudder pedals is conveyed to the control tabs 23 of both floating wings 21 through a common cable interconnecting device indicated generally by the reference character 55, which might be said to be in the form of a composite H or bracket. The cable interconnecting device is shown in detail in a slightly larger scale in Figure 10.

Referring momentarily to Figure 10 it will be noted that a retainer 56 is mounted for rotation about a horizontal axis by virtue of a lug 57 extending between leaves of a bracket 58 and pivotally connected thereto by a pin 59. A bracket indicated generally by the reference character 60 is pivotally connected to the retainer about a vertical axis 61 upon which it is free to rotate. The bracket includes upper and lower parallel arms 62 and 63, respectively, and a pair of horns appropriately described as an intermediate parallel arm 64. From this it will become apparent that the outer ends of the parallel arms are free to move to and fro in substantially horizontal planes and are also permitted to move forwardly and backwardly in vertical planes.

Having reference again to the rudder pedals 51 it will be noted that cables 65 from the right and left rudder pedals, respectively, are connected to corresponding ends of the intermediate parallel arms 64. Depression of one or another of the rudder pedals will therefore rotate the bracket 55 in a corresponding direction about the vertical axis 61. When the left-hand rudder pedal, for example, is depressed, the bracket will rotate clockwise as viewed from the top in Figures 9 and 10. When this occurs a cable 66 from the left end of the upper parallel arm 62 is pulled and this action draws the control tab 23 on the lefthand floating wing 21 upwardly. At the same time a cable 67 from the left end of the lower parallel arm 63 is pulled upon but this cable is crossed to the floating wing 21 on the right side and the action is to lower the control tab 23 on the corresponding wing.

When the left control tab is lifted the result of the action is to tilt the left-hand floating wing downwardly to a greater angle of attack while at the same time the angle of attack of the right-hand floating wing is diminished. This is the relationship illustrated in Figure 7c, the result of which is to cause the airplane to make a horizontal turn toward the left, assuming the diagrams to be of front views of the airplane. When making a right-hand turn a cable 68 from the right-hand end of the upper arm 62 is drawn or pulled upon, lifting the control tab 23 of the right wing, as viewed from the cockpit. At the same time a cable 69 from the right-hand end of the lower arm 63 is crossed to engage the control tab 23 of the left-hand floating wing at a point on the lower side of the tab 23 so that when the cable 69 is drawn upon the control tab 23 is tilted downwardly just the reverse of the control tab 23 on the opposite floating wing.

When, on the other hand, it is desired to cause the plane to nose up the control column 46 is drawn upper end rearwardly. When this occurs, a cable 70 at the lower end of the control column which is attached to the upper end of the retainer 56 tilts the retainer and also tilts the bracket 55 in a corresponding direction, namely, so that the upper end of the bracket moves forwardly. When this occurs cables 66 and 68 are drawn upon and tilt both control tabs 23 upwardly. The effect of this is to tilt both of the floating wings in a direction so as to increase the angle of attack. This will be the relationship illustrated in Figure 7b wherein an increased lifting force is applied to the movable floating wings.

To nose the airplane down the control column 46 is moved upper end forward away from the pilot, this in turn drawing upon a cable 71 which tilts the bottom of the retainer and bracket forwardly. Forward movement as described draws on the cables 67 and 69 simultaneously relieving the cables 66 and 68, the action of which is to tilt the control tabs 23 downwardly. This relationship is illustrated in Figure 7a.

In an airplane constructed in this manner with forward floating wings, lateral control is achieved by the use of conventional ailerons 18 as illustrated in Figures 1 and 2. Cables 72 and 73 the stubs of which are illustrated in Figure 9, operate the conventional ailerons, the cables being manipulated by the wheel 48 on the control column.

In the embodiment here chosen to illustrate the principle of the invention, cables are described as the means of manipulating the tabs. This is intended to be only illustrative of a transfer of motion which could be exercised by any one of a number of conventional agencies.

Trim tabs

Trim tabs 22 are manipulated in a substantially similar manner but are designed to be held in trim position by a trim operative mechanism. The operating mechanism for the trim tabs 22 differs from the operating mechanism for the control tabs 23 only to the extent that trim tabs are prevented from returning automatically to initial position.

In Figure 9 a second cable interconnecting device 55' is shown, this being a duplicate of the cable interconnecting device 55. For shifting the cable interconnecting device 55' so as to trim the airplane to carry a greater load on the floating wings an elevator trim wheel 75 is shown with a gear connection 76 to a trim shift lever 77 pivotally mounted on a shaft 78 on some stationary portion of the airplane at the side of the pilot's cabin. In order to increase the lift on the floating wings 21 the trim tabs 22 must be raised simultaneously. To accomplish this the trim wheel is rotated so as to draw the lower arm 63 of the device 55' forwardly which is accomplished by drawing on a cable 79. This in turn exerts a pull on cables 80 and 81 which in turn are attached to nuts 82, one of which is illustrated in the lower portion of Figure 9. Rotation of the nut 82 there shown in a counterclockwise direction as viewed from aft, for example, elevates the trim tab 22 on the left-hand floating wing while the same movement takes place on the right-hand wing. To return the trim tabs to initial position the trim wheel 75 is rotated so that a cable 83 is drawn upon, tilting the device 55' in the opposite direction.

To trim the airplane to compensate for a directional unbalanced condition a directional trim wheel 84 is rotated. A cable 85 attached to the directional trim wheel rotates the device 55' on its vertical axis in one direction or another, depending on the trim desired. For example, to trim the airplane toward the left the device 84 will be rotated toward the left, to rotate the device 55' counterclockwise as viewed from above so as to draw upon the cable 81 while at the same time releasing tension on the cable 80. At the same time a cable 86 is drawn upon while a cable 87 is released. Although details of a screw for elevating and lowering the trim tab 22 of the right floating wing 21 have been omitted from the drawing in the interest of clarity, it may be understood that tension or a drawing upon the cable 86 rotates an appropriate screw in a counterclockwise direction as viewed from the rear. Counterclockwise rotation is set to lower the angle of tilt of the trim tab 22 of the floating wing 21 on the right, diminishing the angle of attack of that wing. This occurs as the angle of attack of the left floating wing 21 is increased. An opposite rotation resulting in tension on the cables 80 and 87 causes the angle of attack of the right floating wing to increase, as a result of an increase in tilt of the corresponding trim tab 22 on the right floating wing, and the angle of the left floating wing at the same time to decrease.

The airplane may be trimmed for lateral balance in the conventional manner by a separate trim mechanism, not shown, operable upon the ailerons 18.

Some details of mechanism for operating the control tabs 23 are illustrated in Figure 11 and corresponding mechanism for operating the trim tabs 22 is illustrated in Figure 12. In Figure 11, for example, the cable 66 is shown attached at a point 88 on the upper side of the trim tab 23, whereas the cable 69 is attached at a point 89 on the lower side. The control tab is illustrated as rotatable about a pin 90. As a matter of convenience, in illustrating the use of cables as an operating medium, pulleys 91 for the cable 66 and 92 for the cable 69 are shown rotating about a pulley shaft 93 appropriately secured to the wing structure. The interior of the sleeve 44 is also illustrated as providing a passage from the wing for the cables 66 and 69. To render the airplane stall-resistant, movement of the control tabs 23 must be limited to positions which will cause the floating wing to tilt to an angle of attack of not greater than 18 degrees in the chosen example. For this purpose a positive stop 100 on the floating wing may be employed so as to definitely limit angular movement of the control tab in relation to the structure of the floating wing to an amount so that the angle of attack of the floating wing will not exceed the desired maximum, here indicated as being 18 degrees.

Figure 12 shows the trim tab 22 rotating about a pin 94. For manipulating the tab a shaft 95 is shown pivotally secured at the point 96 to the trim tab and carrying fixed at its opposite end a threaded portion 97. Collars 101 and 102 serve as a guide for the shaft 95 and also a stop for locating the nut 82 and against which stop nuts 98 and 99 are adapted to strike to limit the trim angle of the trim tabs 22. Left-hand threads may be employed to induce appropriate endwise movement of the shaft 95. Under the circumstances as shown where the shaft 95 is non-rotatably fixed, the rotation of the nut 82 causes it to engage the threaded portion 97 of the shaft 95 and will reciprocate the shaft 95 in an endwise direction either toward the right or the left as viewed in Figure 12. The stop nuts 98 and 99 limit movement of the shaft 95 and thus determine the limit of movement of the trim tab 22.

*Combined control and trim tabs*

Although the tandem type airplane hereinabove described is found to be particularly effective where the floating wings carry both trim tabs and control tabs, it is possible and some times advisable to simplify the construction by providing control tabs alone with appropriate trim mechanism operable through the normal controls to maintain a certain degree of directional and vertical trim. An arrangement of controls directed to the provision of such a simplified device is illustrated in Figure 13. As there shown there are provided a pair of respectively left and right floating wing surfaces 110 and 110' adapted to be secured to the forward end of the fuselage, as previously described, by a sleeve or torque tube 111. In this instance, however, there is but a single control tab 112 on the wing 110 and a corresponding single control tab 112' on the floating wing 110'. To manipulate the tabs here serving as both control tabs and trim tabs there is provided the previously described control column 44 carrying the wheel 48 assisted by rudder pedals 51', 51' under circumstances where both the control column and the rudder pedals are supported upon the shaft 47. Also there is utilized the same interconnecting device 55 for the cables as was described in connection with Figures 9 and 10. In this arrangement cables 65' extend from the rudder pedals to the arm 64 of the interconnecting device by virtue of which the bracket 60 is rotated about the retainer 56 on its vertical axis. Cables 70 and 71 connect the control column 46 to the retainer 56. The lower point on the control column is connected by cable 70 to the upper end of the retainer 56 and incidently the bracket 60. Conversely the cable 71 connects from the upper side of the control column to the lower end of the retainer 56 and the bracket 60. Thus connected rotation of the control column upon its shaft produces rotation or tilting of the bracket 60 in the opposite direction.

Cables 66' and 67' from the left ends of arms 62 and 63 are connected to the control tabs in such a manner that the cable 66' operates to move the control tab 112 upwardly and cable 67' operates to move the control tab 112' downwardly. A cable 69' on the right end of the arm 63 connects with the control tab 112 to move it downwardly and cable 68' connects with the control tab 112' to move it upwardly.

Thus connected movement of the control column 4 toward the pilot will elevate both control tabs in order to nose the airplane up or conversely to nose the airplane down when the control column is moved forward. By the arrangement just described depression on the left rudder pedal 51' will serve to rotate the bracket 60 so that the control tab 112 is raised increasing the angle of attack of the floating wing 110 while the control tab 112' is lowered decreasing the angle of attack of the floating wing 110', thus inducing the airplane into a horizontal left turn. The opposite relationship would exist under circumstances where the right rudder pedal 51' is depressed.

To trim the airplane longitudinally or vertically a spring trim device 113 is provided including a longitudinal trim crank 114 by the manipulation of which the control column is maintained in a position for longitudinal trim from which position it is moved backwardly or forwardly to elevate or lower the nose of the airplane for normal control or maneuvering.

Similarly a rudder or directional trim mechanism 115 may be employed simultaneously whereby a control wheel 116 can be set so as to depress one or the other of the rudder pedals 51' under spring tension to establish a directional trim. By this arrangement both a longitudinal trim and a directional trim may be maintained without interfering with normal control of the airplane. This arrangement as well as the arrangement described in connection with Figure 9 is dependent upon the maintenance of the longitudinal axes of the floating wings in either a cathedral angular position or a dihedral angular position. Should the wings be extended horizontally in this form of the invention, where but one pair of floating wings are employed, longitudinal control only would be obtained. Under those circumstances the bracket 60 would be made non-rotatable about the vertical axis and permitted to tilt only about the horizontal axis. The rudder cables would be disconnected from the bracket 60 and the control column would operate to control longitudinal flight only regardless of whether floating wings were horizontal or tilted as shown.

In the case of the flying boat using a dihedral angle instead of a cathedral angle, the rudder pedal cables 65 (see Figure 13) would be crossed to get the same directional control.

Correspondingly by reference to Figure 9, if the floating wings were given a dihedral angle instead of a cathedral angle the rudder cables 65 would be crossed as well as would be the directional trim cables 85.

THE TWIN BOOM CONSTRUCTION

Advantages inherent in a tandem airplane having free floating wings or lifting surfaces are augmented to a substantial degree in a twin boom construction shown by way of example in Figures 15, 16 and 17. The chief features of an airplane employing the advantages of a twin boom construction lie in the provision of a fuselage 125 following substantially conventional lines having a forward landing gear 127, a rear landing gear 128, and which may, if desired, include a vertical keel 126. A pair of main wings 129 and 130 supply the maximum lift for the airplane. Propulsion means is here illustrated as comprising reciprocating motors 131 and 132. A cockpit 133 may advantageously be located in the nose of the fuselage 125.

On each side of the fuselage, preferably extending forwardly of the main wings, are booms 134 and 135. On the boom 134, for example, there is located at the forward end what may appropriately be described as an empennage comprising a pair of free floating wings or forward lifting surfaces 136 and 137. These lifting surfaces are, as illustrated in Figure 17, pitched downwardly but may, if preferred, be pitched upwardly as illustrated in Figures 4, 5 and 6. Each of the floating wings includes a trim tab 138 and control tab 139. On the boom 135 there are provided similar free floating wings 140 and 141 likewise provided with trim tabs 138 and control tabs 139.

Because of the ability by use of twin sets of floating wings to exercise directional, longitudinal and vertical control over the airplane it becomes possible to use flaps 142 which extend the full length of the trailing edges of the main wings. While it is appreciated that it might be desirable on occasions to employ on the main wings conventional ailerons in company with flaps having less than a full span for the purpose of minimizing torsional stresses, advantages of full span flaps frequently outweigh other advantages. Where full span flaps are used take off and landing speeds can be reduced and substantial increase in the load factor can be realized. Because control in all directions may be exerted by the forward empennages or floating wings, the rudder, and even the keel, may be dispensed with.

To understand the maneuverability inherent in a tandem type airplane equipped with twin booms as illustrated in Figures 15, 16 and 17, reference is made to Figures 18 through 18c where adjustments of the floating wings are illustrated diagrammatically for different positions of control. The diagrams of Figures 18 through 18c are illustrative only but it is believed that a specific description of those diagrams is sufficient to impart a knowledge of the manner in which the floating wings and twin boom construction can be manipulated to achieve control of the plane in all directions, whether for flying or for trim.

In Figures 18 through 18c the twin booms 134 and 135 are illustrated as they appear viewed from the front of the airplane. It should be recalled in connection with this description that the boom 134 should be considered as the right-hand boom as viewed from the pilot seat and the boom 135 as the left-hand boom, although they appear in the reverse direction in Figures 18 through 18c, which more aptly illustrates the tilt of the floating wings.

Figure 18 shows the position of the floating wings for straight level flight. For the purpose of this illustration it is assumed that an angle of attack of 4 degrees is necessary to maintain a sufficient upward thrust to meet the load requirements. Ordinarily the main wings will be tilted slightly upwardly at substantially the same angle. In this adjustment as will be noted from the vector diagrams there is an upward thrust pressure on the floating wings. There is also incidentally a lateral component represented above the upward thrust but in the case of each boom the lateral thrusts counterbalance making the lateral thrust zero and the airplane with the floating wings thus adjusted will be in straight level flight.

To nose the airplane down to a descending attitude, the angle of attack of the floating wings is diminished and while it might be diminished to such an extent that the angle of attack is negative, nevertheless nose down condition can be achieved and may be sufficient where the angle of attack is diminished but still remains a positive angle of attack such as the 2-degree angle illustrated in Figure 18a.

Resorting again to the vector diagrams it will be noted that the vertical component resulting from the force of the air stream on the floating wings is diminished by about one-half which is insufficient to maintain level flight. Actually the nose of the airplane will tilt downwardly while the angle of attack of the floating wings remains set at plus 2 degrees. In accordance with the principle already described in detail the angle of attack of the main wings will simultaneously reduce until they again carry the same proportion of the load as they did initially. At this time the force causing the nosing down condition is no longer present. The total lift being less then than the weight of the airplane, the airplane dives or descends.

In order to turn the twin boom airplane toward the left in level flight the floating wings of each of the booms are adjusted to the same angles of attack and in the same direction as illustrated in Figure 18b. Note that for the boom 134 the angle of attack of the floating wing 137 is increased from 4 degrees to 6 degrees, while at the same time the angle of attack of the floating wing 136 is reduced from 4 degrees to 2 degrees. Since the sum of the angles of attack of the wings equals 8 degrees, which is the same as the 8-degree sum of the angles of attack in Figure 18, a level flight condition is maintained.

In other words the sum of the vertical components of the forces upon the wings shown in Figure 18b equals the sum of the vertical components of the forces shown in Figure 18.

The directional components will not balance in Figure 18b as they did in Figure 18, the force toward the left exceeding the force toward the right. Consequently there will be a tendency for the airplane to turn toward the left.

Simultaneously for the boom 135 the same circumstance will prevail resulting in the directional component of the forces being greater toward the left as viewed from the pilot cockpit, while at the same time the vertical components of the forces on the floating wings 140 and 141 will in the aggregate equal the vertical components in Figure 18, thereby to sustain level flight. Since the adjustment of both booms tends to turn the respective booms toward the left, the airplane will turn toward the left. To turn the airplane toward the right the operation is merely reversed.

To achieve lateral control without a change in altitude a different adjustment of the floating wings is made. One such adjustment is illustrated in Figure 18c, namely, the adjustment for guiding the airplane so that the right wing rolls down. As illustrated, this is accomplished by reducing the angle of attack of the floating wings 136 and 137 by the same amounts, namely, 2 degrees, as illustrated in Figure 18c. This adjustment has the effect of causing the bom 134 of the airplane to lower.

At the same time the floating wings 140 and 141 are adjusted so that the angle of attack is increased, the increase in the example illustrated being to an angle of 6 degrees. The increase in the angle of attack will increase the vertical thrust or vertical vector component on the boom 135 causing that boom to rise. The result of the boom 134 lowering and the boom 135 raising is to throw the airplane into a right wing down roll, thus changing the lateral attitude of the airplane.

It should be remembered in this connection also that the aggregate sum of the vertical forces upon both booms is equal to the aggregate sum of vertical forces on both booms for level flight even though the forces are unbalanced on opposite sides of the airplane. The fact that the sum total of the angles of attack or of the floating wings, 136, 137, 140 and 141 is equal to 16 degrees which is the same as the sum total of the angle of attack for all the wings for straight level flight, namely, 16 degrees, evidences the fact that the aggregate vertical thrust is the same in each case. Therefore, the attitude of the airplane when adjusted in accordance with the diagram of Figure 18c is a right wing down roll without vertical or directional affect on the flight path. For a left wing down roll the adjustment is reversed.

From the foregoing explanation it will be appreciated that further adjustments which are a combination of those described in detail are possible. For example, the airplane while adjusted to a nose down condition for losing altitude may also be turned toward the right or left by increasing the angles of attack of one of the floating wings on each of the booms 134 and 135 and decreasing the angles of attack on the respectively opposite floating wings. The airplane can also be rolled laterally simultaneously. Virtually any combination is possible with the two pairs of floating wings on parallel booms located on opposite sides of the airplane.

PILOT CONTROL MECHANISM FOR THE TWIN BOOM ARRANGEMENT

*Control tabs*

To control all of the floating wings on both booms so as to achieve the control described in connection with Figures 18 through 18c, inclusive, from a single set of controls in the pilot cockpit, a double arrangement of cable interconnecting devices becomes requisite. The double arrangement is illustrated diagrammatically on a smaller scale in connection with Figure 19 while the cable interconnecting devices are shown in perspective and drawn to a larger scale in Figure 20. For greater ease in understanding the interconnection, the airplane shown in outline in Figure 19 has parts corresponding to the parts described in connection with Figures 15, 16 and 17, identified by the same reference characters, namely, the fuselage 125, the vertical keel 126 and main wings 129 and 130 upon which are mounted the twin booms 134 and 135. In the diagram as in Figures 15 through 17, inclusive, boom 134 is provided with a pair of floating wings 136 and 137 while the boom 135 is provided with floating wings 140 and 141. The floating wings in turn include the control tabs 139 and trim tabs 138.

It is believed that mechanism for controlling the floating wings from the pilot compartment will be more easily understood by first making reference to cable interconnecting devices indicated generally by the reference characters 150 and 151. The device 151, including bracket 152', is adapted to control the floating wings 136 and 137 and the device 150, including bracket 152, is adapted to control the floating wings 140 and 141. These cable interconnecting devices are somewhat similar to the interconnecting devices 55 illustrated in Figure 10 with some slight variations, the interconnecting devices 150 and 151 being substantially identical one with respect to the other. As shown in Figure 20 there are provided upper and lower parallel arms 153 and 154, respectively, connected together by a strap 155. The bracket is illustrated as being pivotally connected to a retainer 156 by a suitable pin extending through an axis 157, which axis will customarily be a vertical axis.

The retainer 156 is in turn provided with a lug 158 pivotally secured to a pair of ears 159 of a fitting fixed upon the framework of the fuselage in a conventional manner, details of which have been omitted for the purpose of clarity. It is sufficient to say that the retainer 156 is so mounted as to enjoy a tilting movement about a horizontal axis 160 which means that the bracket 152 likewise tilts about the same horizontal axis. Precisely the same movements are embodied in the cable interconnecting device 151.

Also on the bracket 152 is a laterally extending rudder bracket or horn 161 and a rudder cross tie bracket or horn 162 at right angles to the rudder bracket 161. On the bracket 152' of the interconnecting device 151 is a substantially similar rudder bracket 163 and cross tie bracket 164.

As illustrated in both Figures 19 and 21 rudder pedals 170 and 171 are mounted upon a shaft 172. A cable 173 from the rudder pedal 170 is joined to the rudder bracket 163 of the interconnecting device 151 and a cable 174 connects the rudder pedal 171 with the rudder bracket 161 of the interconnecting device 150. So that the rudder pedals may be interconnected a rudder tie 175 joins the rudder tie brackets 162 and 164. Therefore, depression of one or the other of the rudder pedals 170 and 171 rotates the interconnecting devices simultaneously toward the right or left about their respective vertical axes.

To rotate the brackets 152 and 152' about their respective horizontal axes in proper sequence special connections must be preserved. For example, a cable 176 from the top of the bracket 152 extends to the bottom of a control column 177 at a point below the shaft 172 and extends around a pulley 178 to the top of the bracket 152'. By this arrangement it will be immediately apparent that movement of the control column 177 will tilt the devices 150 and 151 in the same directions about their respective horizontal axes. To return the cable interconnecting devices to initial adjustment a cable 179 attached to the bottom of the bracket 152 extends around a pulley 180 on the control column 177, the pulley 180 being on the opposite side of the control column as is the control device 150. The cable 179 continues around but anchored to a pulley 181 keyed to a pilot wheel 182 and thence around a pulley 183 from which it extends to the bottom of cable interconnecting device 151. From this it will be evident that when the control column is tilted upper end forwardly the interconnecting devices 150 and 151 will be tilted upper ends rearwardly because the control column draws upon the cable 179 and gives or releases with respect to the cable 176.

Regardless of the position of the control column the wheel 182 may be manipulated to the end that rotation of the wheel will tilt the interconnecting devices 150 and 151 in opposite directions about their horizontal axes.

The interconnecting device 150 serves both of the control tabs 139 of the floating wings 140 and 141, whereas the interconnecting device 151 serves the corresponding control tabs 139 of the floating wings 136 and 137. Since the cable system between the interconnecting device and the corresponding control tabs is the same for both sides of the airplane it is believed that a detailed description of one will suffice for both. Reference is therefore made to Figure 21 which shows the cable system drawn to a somewhat larger scale wherein the boom 135 and its corresponding cable connections is depicted, the wing being foreshortened for convenience in illustration.

At one end of the arm 153 a cable 190 extends to the upper side of the control tab 139 of the floating wing 141 to the end that clockwise rotation of the bracket 152 as viewed from the top will raise the control tab in an angular direction upwardly. A cable 191 attached to the arm 154 at the end on the opposite side of the vertical axis extends to the lower side of the same control tab 139 to the end that counterclockwise rotation of the bracket 152 lowers the control tab 139 in an angularly downward direction. The connections of the cables 190 and 191 to the control tab are similar to the connections of the cables 66 and 69 to the control tab 21 shown in Figure 11.

For the control tab 139 of the floating wing 140 a cable 192 is attached to the arm 153 at the end opposite from the cable 190 and this cable 192 attaches to the top side of the control tab 139 to the end that counterclockwise rotation of the bracket 152 as viewed from above raises the control tab 139 in an angularly upward direction. A cable 193 attached to the lower arm 154 on the side opposite from the cable 191 is attached to the lower side of the control tab 139 of the floating wing 140 to the end that clockwise rotation of the bracket 152 as viewed from above depresses the attached control tab 139 in an angularly downward direction.

For the interconnecting device 151 a cable 194 connects to the top side of the control tab 139 of the floating wing 137. A cable 195 connects to the bottom side of the same tab. A cable 196 connects to the top side of the control tab 139 of the floating wing 136, whereas a cable 197 connects to the bottom side of the same tab. In the control arrangement thus described the various adjustments, examples of which have been shown in connection with Figures 18 through 18c, inclusive, can be achieved. In construing the schematic presentation of these adjustments it again should be borne in mind that the angular disposition of the floating wing will be exactly opposite to the angular disposition of the control tab on the floating wing.

For example, assuming all the control tabs 139 to be initially elevated an angular amount of 4 degrees, the corresponding floating wings 136, 137, 140 and 141 will be tilted so that the trailing edge is down, thus presenting a positive angle of attack of substantially 4 degrees.

To nose the airplane of Figures 19 and 20 downwardly all of the control tabs 139 will need to be depressed. This is accomplished by pushing the control column 177 upper end forwardly. Forward motion of the control column 177 tilts the bottoms of both interconnecting devices and the brackets thereon forwardly thus drawing upon the cables 191, 193, 195 and 197, the effect of which is to depress all the tabs 139 angularly downwardly. The cables on the top sides of all the tabs will be released a corresponding amount as the tops of the respective brackets and tabs tilt in the opposite direction.

To achieve a level flight left turn as illustrated diagrammatically in Figure 18b the rudder pedal 171 is depressed the action of which is to draw upon the cable 174 which action tends by a pull upon the rudder tie 175 to draw upon the cable 173 and shift the rudder pedal 170 in the opposite direction. Springs 200 may be utilized to keep the cables tight but are not necessary to the operation of the system.

Pressure upon the rudder pedal 171 tends to rotate both brackets 152 and 152' in a clockwise direction about their respective vertical axes. The effect of this clockwise rotation of the interconnecting device 150 and corresponding bracket 152 is to exert tension on the cable 190, the effect of which is to lift or elevate the control tab 139 of floating wing 141 to achieve a total tilt of the floating wing 141 of 6 degrees which conforms to Figure 18b. At the same time tension on cable 193 draws upon the lower side of the control tab 139 of floating wing 140 to depress it a corresponding angular amount so that the angle of attack of that floating wing is 2 degrees. In other words the change has been a 2-degree change but resulting in the increase of the tilt of one wing by 2 degrees, making the effective tilt 6 degrees, and a decrease in the tilt of the other wing 2 degrees, making the effective tilt 2 degrees.

The rudder tie 175 always acts between the brackets 152 and 152' to cause them both to rotate in the same direction about the vertical axes when the rudder pedals are manipulated.

At the same time clockwise rotation of the interconnecting device 151 and corresponding bracket 152' results in tension upon the cable 194 which raises the control tab 139 on floating wing 137 to an effective 6-degree position of the floating wing 137, as indicated in Figure 18b. This position for descriptive purposes may be designated a positive angle of attack. Simultaneous tension of the cable 197 lowers the tab 139 of wing 136 a corresponding amount. The result is a level flight left turn as has been previously explained in connection with Figure 18b. From the foregoing explanation it will become obvious that depression of the rudder pedal 171 will result in a left-hand turn and that by manipulation of the control column the rudder pedals and the wheel simultaneously the airplane can be induced to perform any one or all of the adjustments in combination, that is to say, for directional, lateral and vertical control.

*Trim tabs*

Although the control tabs can be utilized to trim the flight of the airplane in a manner similar to the trim device described in connection with Figure 13, it has been found advantageous to employ an independent set of trim tabs 138, one for each of the floating wings 136, 137, 140 and 141. The trim tabs 138 include an operating mechanism for raising and lowering the trim tabs similar in construction and operation to the mechanism described in Figure 12 as employed with the trim tabs 22. To manipulate the trim tabs from the pilot cockpit, trim setting devices are employed, connected if preferred by cables to cable interconnecting devices which are the counterparts of the interconnecting devices 150 and 151, the interconnecting devices in turn being tied to the tab operating mechanism by similar means.

A trim setting device 210 is positioned in the pilot cockpit so as to rotate about a horizontal axis 211. The device 210 in fact is two trim setters in one in that it may be used for both lateral and longitudinal trim. The device is comparable to a control column in miniature and is designed for fixed settings once the trim has been established. The trim setting device may be described as constituting a trim column 212 at the lower end of which is a pulley 213 around which a cable 214 is reaved, the cable 214 being attached to the upper ends of brackets 215 and 216 of cable interconnecting devices 217 and 218, respectively.

A second cable 219 attached to the lower ends of the brackets 215 and 216 extends to the trim column 212 at the circumference of pulleys 220 and from there is reaved around a pulley 221 fixed to a shaft rotated by a trim crank 222.

To rock the trim column there is provided a trim crank 223 connected to a gear 224 which meshes with an arcuate rack 225 on the trim column to the end that by rotating the crank 223 the trim column 212 is rocked about its axis 211. When the trim column is rocked upper end forwardly the bottoms of the brackets 215 and 216 are rocked forwardly and the tops rocked backwardly, the reverse being true when the trim column is rocked upper end backwardly. When the trim crank 222 is rotated one or the other of the brackets 215 or 216 is rocked forwardly as the opposite bracket is rocked backwardly. This can be accomplished independently of the setting of the trim column 212.

For rudder or directional trim there is provided a rudder trim crank 226 which may include a set of gears 227 including a locking arrangement for holding the setting once it has been established. A rudder trim cable 228 is attached to and extended around the trim crank pulley and is attached one end to a rudder tie bracket 229 on the bracket 215 and the other end to a rudder tie bracket 230 on the bracket 216. Here again a rudder tie cable 231 interconnects the rudder tie brackets to compel both brackets 215 and 216 to move simultaneously when rotating about vertical axes 232 and 233. Other details of the mechanical construction of the cable interconnecting devices 217 and 218 have been omitted for the sake of clarity in illustrating the cable ties but the details essentially duplicate the details described in connection with Figure 20.

From an upper arm 234 of the bracket 216 a cable 235 extends through the main wing 130 and boom 135 out into the floating wing 141 to a screw 236 and then around the screw returning through the boom and wing to engagement with an arm 237 at the end opposite from the connection to the arm 234. A cable 238 attached to the end of upper arm 234 opposite from the attachment of cable 235 extends through the wing and boom to a screw 239 which operates the trim tab 138 of floating wing 140. From the screw the cable returns through the boom and wing to a point of attachment to the arm 237 at the end opposite from the attachment of cable 235.

A cable 240 from an upper arm 241 of the bracket 215 extends to a corresponding screw, not shown, of the trim tab 138 on floating wing 137 and returns to a connection to a lower arm 242 on the side opposite the upper connection. Similarly a cable 243 from the corresponding side of the arm 241 extends to a screw, not shown, designed to operate the trim tab 138 on floating wing 136 and returns to a connection at the end of the arm 242 on the opposite side.

With the arrangement thus described where it is desired to trim the trim tabs to compensate for a load displaced from the normal location of the center of gravity, the trim crank 223 is operated forwardly or backwardly as the situation may require. Should the unbalanced condition have caused a shift forward of the center of gravity, then a greater upward trim would be required. This is accomplished by rotating the trim crank 223 so as to tilt the top of the trim column 212 rearwardly. This tilts the tops of the brackets 215 and 216 forwardly so that the cables rotate the screws in a direction to tilt all of the trim tabs 138 upwardly the same amount.

For an unbalanced lateral loading it is necessary to trim the floating wings on the side having the greater loading in a direction so that an increased lift will counterbalance the increased loading. The trim operation used to accomplish this end corresponds to the control operation designed to roll the airplane. If, for example, there is an unbalanced increase in loading on the main wing 130, the trim tabs 138 of the floating wings 140 and 141 should be manipulated to increase the angle of attack of these floating wings. This would be a trim adjustment somewhat similar to the control adjustment illustrated in Figure 18c. To set such a trim the trim crank 222 is rotated in a direction such that the bracket 216 is tilted upper end forward thus causing the trim tabs 138 to lift and increase the angle of attack of both the floating wings 140 and 141. The cables 235 and 238 because of being connected to both upper and lower arms of the brackets transfer the forward tilt of the upper ends of the brackets to a rearward tilt of the lower ends of the same brackets. At the same time the bracket 215 is tilted upper end rearwardly and this motion through the appropriate cables 240 and 243 depresses the trim tabs 138 on the floating wings 136 and 137 so that the angle of attack of the last-identified floating wings is diminished. The result is the tendency to lift the left wing of the airplane by an increasing amount comparable to the increase in unbalanced weight on the left side of the airplane.

For directional or rudder trim the rudder trim crank 226 is operated. A typical condition necessitating directional trim would be failure of the engine on the right side of the airplane to operate. Continued operation of the left side motor would have a tendency to turn the airplane toward the right; hence a trim tending to turn the airplane toward the left would be necessary to balance the unbalanced power thrust.

To operate the trim tabs in order to accomplish this trim, the rudder trim crank 226 is operated so that tension is exerted on the end of the cable 228 which is attached to the bracket 216 causing it to rotate clockwise about its vertical axis. At the same time the bracket 215 will be caused to rotate clockwise on account of the tie 231 between them. Consequently the ends of cables 235 and 238 attached to the arms 234 and 237 at the same side as the cable 228 will be placed under tension causing the trim tab of the floating wing 141 to raise and the trim tab of the floating wing 140 to lower, thus increasing the angle of attack of the floating wing 141 and diminishing the angle of attack of the wing 140. At the same time tension on the ends of cables 240 and 243 which join the arms 241 and 242 at the side opposite the cable 228 will cause the trim tab 138 of the floating wing 137 to raise, increasing the angle of attack of that floating wing and the trim tab 138 of the floating wing 136 to lower, decreasing the angle of attack of that floating wing. This is a relationship similar to that shown in connection with Figure 18b. The result is a set tendency to turn the airplane directionally toward the left an amount sufficient to counterbalance the tendency of the dead motor on the right wing to turn the airplane toward the right.

It will be readily understood that all degrees of trim for different unbalanced conditions can be accomplished by operation of the three trim cranks described following a procedure parallel to operation of the control column and rudder pedals previously described. Therefore, an airplane equipped with floating wings and controls as described in connection with Figures 19, 21 and 22 can be flown and trimmed for any condition without any necessity for using a conventional rudder or ailerons. Because of this complete control by means of the floating wings, use of full span flaps 142 can be enjoyed. It will be further appreciated, however, that some circumstances may render it advisable to employ ailerons on the main wings or one type or another of rudder for which appropriate controls of a conventional nature can be included without impairing in any way the operation of the complete control system herein described. In fact a more thorough control of every phase of operation of an airplane can be accomplished by the utilization of the floating wing system in connection with other conventional controls than is possible upon any other type of airplane heretofore designed. The improved versatility inherent in the twin boom floating wing construction is also to be found in the more simple version described in connection with Figures 9 and 13.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

Having herein described my invention, what I claim as new and desire to secure by Letters Patent is:

1. A tandem airplane comprising a fuselage, a main wing section, the center of lift of said main wing section being located aft of the center of gravity of the airplane, propulsion means, and a pair of forwardly disposed floating wings having each a freely rotating pivotal connection to the airplane on opposite sides thereof forward of the center of gravity, each of said floating wings having an axis of rotation extending longitudinally intermediate leading and trailing edges thereof and said axes being deflected at equal angles from the horizontal, control tabs pivotally mounted on the trailing edges of the floating wings for movement throughout positive and negative angles with respect to the floating wings, a control column having connections therefrom to the tabs adapted to move both said tabs simultaneously in the same direction, rudder pedals having connections to said tabs interconnected with said first identified connections and adapted to move said tabs in directions opposite to each other, trim tabs pivotally mounted on the floating wings in axial alignment with the control tabs, a vertical trim setter in the airplane having connections therefrom to the trim tabs adapted to move said trim tabs simultaneously in the same direction and a direction trim setter having connections to said trim tabs interconnected with the connections from the vertical trim setter to the trim tabs adapted to move said trim tabs in opposite directions.

2. A tandem airplane comprising a fuselage, a pair of main wings having ailerons thereon, the center of lift of said main wings being located aft of the center of gravity of the airplane, a keel on the fuselage aft of the center of gravity, propulsion means, and a pair of forwardly disposed floating wings each pivotally mounted upon a longitudinal axis thereof on opposite sides of the fuselage forward of the center of gravity for unrestricted rotational movement, each of said floating wings having a longitudinal axis of rotation extending intermediate leading and trailing edges thereof and said axes being deflected at equal angles from the horizontal, control tabs pivotally mounted on the trailing edges of the floating wings for movement throughout positive and negative angles with respect to the floating wings, stops cooperable with the tabs and the respective floating wings adapted to limit angular movement to an angle of not more than a stalling angle in either positive or negative direction, a control column having connections therefrom to the tabs adapted to move both said tabs simultaneously in the same direction, rudder pedals having connections to said tabs interconnected with said first identified connections and adapted to move said tabs in directions opposite to each other, and a lateral control on the column having continuous connections to the ailerons on the main wings adapted thereby to move the ailerons in directions opposite from each other.

3. A tab operating mechanism for airplanes having a twin pair of freely rotatable wings located one on each side of the airplane and control tabs on the wings adapted to be raised and lowered comprising a control column, a directional control and means for interconnecting connections from the control column and directional control to the tabs on all said rotatable wings, said means comprising a bracket for the pair of rotatable wings on each side of the airplane each having one rotatable mounting on a vertical axis and another rotatable mounting on a horizontal axis, a connection from the bottom sides of the tabs of each pair of rotatable wings to opposite sides of the respective bracket on one side of the horizontal axis, a connection from the top sides of the same tabs to opposite sides of the respective bracket on another side of the horizontal axis, connections from the directional control to the brackets on respectively opposite sides of the vertical axis and a directional cross tie between said brackets, connections from the control column on opposite sides of a pivot point thereof to both brackets on the same respective sides of the horizontal axes, a lateral control wheel on the control column, one of said last identified connections being reversed and having an independently operable connection to the lateral control wheel.

4. A tandem airplane embodying multiple directional control by operation of forwardly disposed empennage sections comprising a fuselage, a main wing section aft of the center of gravity of the airplane, a propulsion means, pairs of auxiliary floating wings on the airplane forward of the center of gravity and located one pair on each side of the fuselage, the wings of each pair having a freely rotating connection to the airplane throughout normal flying positions, the axes of wings of each pair of auxiliary wings being disposed angularly to each other, control tabs on each auxiliary wing, pilot control means in the airplane adapted to directional, longitudinal and vertical control of the airplane, control interconnecting means, one set of connections from the pilot control means to said interconnecting means adapted to impart selective multiple direction adjustment to said interconnecting means and another set of connections from the tabs of each of said pair of wings to the interconnecting means adapted to move the tabs to the same or different positions with respect to each other in response to adjustment of the interconnecting means.

5. A tandem airplane having a multiple directional control by operation of forwardly directed empennage sections comprising a fuselage, a pair of main wings, a propulsion means and twin supports on opposite sides of the airplane, an empennage section on each support including a pair of auxiliary wings on each support having an unrestricted pivotal connection to the support, said auxiliary wings being on the opposite fore and aft side of the center of gravity from said main wings, control tabs on each auxiliary wing, control devices located in the airplane adapted to directional, longitudinal and vertical control of the airplane, a control device interconnecting means and connections from at least two of said control devices through the interconnecting means to the tabs independently of said auxiliary wings and adapted thereby to move the tabs in pairs on the same or opposite sides of the airplane to positions the same as or different from the positions of the remaining pair of tabs.

6. A tandem airplane having multiple directional control by operation of forwardly disposed empennage sections comprising a fuselage, a pair of main wings, a propulsion means and twin booms on opposite sides of the fuselage, an empennage section on each boom including a pair of auxiliary wings having an unrestricted pivotal connection to the boom, the axes for auxiliary wings on the same boom being displaced at angles disposed from the horizontal, control tabs on each auxiliary wing, control devices located in the fuselage adapted for respectively directional, longitudinal and vertical control of the airplane, a control device interconnecting means and connections from the control device for directional control and at least one of the other control devices through the interconnecting means to the tabs independently of said auxiliary wings and adapted thereby to move the tabs in pairs on the same or opposite sides of the airplane to positions the same as or different from the positions of the remaining pair of tabs.

7. A tandem rudderless airplane having three directional control by operation of forwardly disposed empennage sections comprising a fuselage, a pair of main wings, a propulsion means and twin booms on opposite sides of the fuselage, an empennage section on each boom including a pair of auxiliary wings adjacent the forward end of each boom having an unrestricted pivotal connection to the boom, the axes for auxiliary wings on the same boom being displaced at angles diverging from the horizontal, control tabs on each auxiliary wing, a directional control and a control column provided with a lateral control device located in the fuselage, a control device interconnecting means and connections from the directional control and control column through the interconnecting means to the tabs independently of said auxiliary wings and adapted thereby to move the tabs in pairs on either the same or opposite sides of the airplane to positions the same as or different from the positions of the remaining pair of tabs.

8. A tandem rudderless airplane having three directional control by operation of forwardly disposed empennage sections comprising a fuselage, a pair of main wings having full span flaps, a vertical keel, a propulsion means and twin booms extending forwardly from the respective main wings, an empennage section on each boom including a pair of auxiliary wings adjacent the forward end of each boom having an unrestricted pivotal connection to the boom, said pivotal connections having the axes of rotation lying intermediate leading and trailing edges of the respective auxiliary wings, the axes for auxiliary wings on the same boom being displaced at equal angles with respect to the horizontal and the angular disposition of axes on opposite booms being equal, control tabs on each auxiliary wing, rudder control pedals and a control column provided with a wheel located in the fuselage, control interconnecting means and connections from the rudder control pedals and control column through the interconnecting means to the tabs independently of said auxiliary wings and adapted thereby to move the tabs in pairs on the same or opposite sides of the airplane to positions the same as or different from the positions of the remaining pairs of tabs.

9. A tandem rudderless airplane having three directional control by operation of forwardly disposed empennage sections comprising a fuselage, propulsion means, a main wing section, and empennage sections comprising a pair of floating wings on each side of the forward end of the airplane, the wings of each pair being disposed at an angle to each other and pivotally mounted for free rotational movement on the airplane, control tabs pivotally mounted on the floating wings and means adapted to selectively move said tabs to the same and different angular positions comprising pilot control means respectively adapted for vertical, longitudinal and directional control, right and left interconnecting devices for the right and left pair of floating wings respectively, each said device being mounted on the airplane for movement on axes transversely disposed to each other, connections from the pilot control means to both said devices adapted to selectively move said devices in the same or opposite directions about both axes in response to adjustment of the pilot control means, and sets of connections from the tabs of each pair of floating wings to the respective interconnecting device adapted to selectively move said tabs to the same or different positions in response to adjustment of the pilot control means.

10. A tandem rudderless airplane having three directional control by operation of forwardly disposed empennage sections comprising a fuselage, propulsion means and a main wing section, twin supports on opposite sides of the fuselage, an empennage section at the forward end of each support comprising a pair of auxiliary wings disposed at oblique vertical angles from a horizontal plane and having an unrestricted pivotal mounting on the support, control tabs on the auxiliary wings and means adapted to rotate all said tabs to different angular positions on the wings comprising a tiltable control column and a wheel on the column, rudder pedals and right and left interconnecting devices, each said device being pivotally supported on the airplane for rotation about a horizontal axis and about a vertical axis, connections from the devices on opposite sides of the vertical axes and the same side of the horizontal axes to the upper sides of the respective tabs on respective supports, connections from the devices on opposite sides of the vertical axes and on the same side of the horizontal axes to the lower sides of respective tabs in the respective supports, a connection from the wheel and from the column on one side of the axis thereof to the lower sides of both devices, a connection from the column on the other side of the axis thereof to the upper sides of both devices, connections extending directly from opposite sides of right and left devices to right and left rudder pedals and a cross tie between said devices.

11. A tandem rudderless airplane having three directional control by operation of forwardly disposed empennage sections comprising a fuselage, propulsion means and a main wing section, twin booms located forwardly relative to the main wing section, an empennage section on each boom comprising a pair of auxiliary wings disposed at oblique vertical angles from a horizontal plane and having each an unrestricted pivotal mounting on the boom, control tabs on the auxiliary wings and means adapted to move all said tabs to different angular positions comprising a pivoted control column and a wheel on the column, rudder pedals and right boom and left boom interconnecting devices, each said device comprising a retainer pivotally supported on the airplane on a horizontal axis, a bracket pivotally supported on the retainer on a vertical axis, upper and lower parallel arms on the bracket, connections from opposite sides of the upper arms of both brackets to the upper sides of the respective tabs on respective booms, connections from opposite sides of the lower arms of both brackets to the lower sides of respective tabs in the respective booms, a connection passing around the wheel and from the column on one side of the pivotal mounting thereof in reverse directions to the lower sides of both brackets, a connection from the column on the other side of the axis thereof to the upper sides of both brackets, laterally directed extensions on the bracket substantially in the plane of the horizontal axis thereof, connections extending directly from the extensions of respective right and left boom brackets to right and left rudder pedals and a cross tie between extensions of right and left boom brackets.

12. A tandem airplane having three directional control by operation of forwardly disposed empennage sections comprising a fuselage, propulsion means and a main wing section, twin booms on opposite sides of the fuselage, an empennage section at the forward end of each boom comprising a pair of auxiliary wings disposed at oblique vertical angles from a horizontal plane and having an unrestricted pivotal mounting on the boom, sets of control tabs on the auxiliary wings, sets of trim tabs on the auxiliary wings in horizontal alignment with the control tabs, and separate means adapted to move all the control tabs and all the trim tabs independently, each said means comprising right and left boom interconnecting devices, each said device having a movable support on a horizontal axis and a second movable support on a vertical axis, upper and lower connections on each device, connections from opposite sides of the upper connections of left and right devices to upwardly moving connections on respective tabs on respective left and right booms, connections from opposite sides of the lower connections of left and right devices to downwardly moving connections on respective tabs on respective left and right booms, lateral extensions on the devices, rudder pedals and a rudder trim member, interconnected rudder connections from the pedals to extensions on corresponding devices and from the rudder trim member to extensions on other corresponding devices, a flying control column and a trim control column pivoted on transverse axes each having a lateral control wheel thereon, connections from the wheels and both columns on one side of the axes thereof to the upper sides of the respective devices in reverse arrangement, and connections from both columns on the other sides of the axes thereof to the lower sides of respective brackets, all said interconnecting devices being operable simultaneously in response to pilot guidance.

References Cited in the file of this patent

UNITED STATES PATENTS

| | | |
|---|---|---|
| 1,836,681 | Palmquist | Dec. 15, 1931 |
| 2,156,994 | Lachmann | May 2, 1939 |
| 2,326,819 | Berlin | Aug. 17, 1943 |
| 2,369,832 | Klose | Feb. 20, 1945 |
| 2,373,575 | Lemonier | Apr. 10, 1945 |
| 2,401,790 | Noyes et al. | June 11, 1946 |
| 2,406,588 | Cornelius | Aug. 27, 1946 |
| 2,430,793 | Wells | Nov. 11, 1947 |
| 2,582,348 | Northrop et al. | Jan. 15, 1952 |
| 2,601,962 | Douglas | July 1, 1952 |

FOREIGN PATENTS

| | | |
|---|---|---|
| 40,203 | France | Jan. 30, 1932 |
| | (1st addition to No. 673,713) | |
| 576,120 | Great Britain | Mar. 20, 1946 |
| 838,630 | France | Dec. 16, 1938 |
| 852,599 | France | Oct. 30, 1939 |